United States Patent
Chou et al.

[11] Patent Number: 6,060,685
[45] Date of Patent: May 9, 2000

[54] METHOD FOR MONITORING LASER WELD QUALITY VIA PLASMA LIGHT INTENSITY MEASUREMENTS

[75] Inventors: Mau-Song Chou, Rancho Palos Verdes; Christopher C. Shih, Torrance, both of Calif.; Bryan W. Shirk, Mesa, Ariz.

[73] Assignee: TRW Inc., Redondo Beach, Calif.

[21] Appl. No.: 08/956,607

[22] Filed: Oct. 23, 1997

[51] Int. Cl.$^7$ .................. B23K 26/02; B23K 26/20
[52] U.S. Cl. ................. 219/121.83; 219/121.64
[58] Field of Search ............ 219/121.83, 121.63, 219/121.64; 700/166

[56] References Cited

U.S. PATENT DOCUMENTS

| | | |
|---|---|---|
| 4,687,539 | 8/1987 | Burns et al. |
| 4,998,005 | 3/1991 | Rathi et al. |
| 5,045,669 | 9/1991 | Ortiz, Jr. et al. |
| 5,059,761 | 10/1991 | Koegl et al. |
| 5,155,329 | 10/1992 | Terada et al. ............ 219/121.83 |
| 5,247,155 | 9/1993 | Steen et al. |
| 5,256,852 | 10/1993 | Boudot . |
| 5,272,312 | 12/1993 | Jurca ...................... 219/121.63 |
| 5,283,416 | 2/1994 | Shirk . |
| 5,286,947 | 2/1994 | Clyde et al. ............ 219/121.83 |
| 5,304,774 | 4/1994 | Durheim ................. 219/121.83 |
| 5,329,091 | 7/1994 | Bissinger ............... 219/121.83 |
| 5,360,960 | 11/1994 | Shirk ...................... 219/121.83 |
| 5,446,257 | 8/1995 | Sakamoto et al. ...... 219/121.83 |
| 5,486,677 | 1/1996 | Maischner et al. ..... 219/121.83 |
| 5,506,386 | 4/1996 | Gross . |
| 5,961,859 | 10/1999 | Chou et al. ............. 219/121.63 |

FOREIGN PATENT DOCUMENTS

| | | |
|---|---|---|
| 344339 | 12/1989 | European Pat. Off. ....... 219/121.83 |
| 4030303A1 | 12/1990 | Germany . |
| 4027714 | 3/1992 | Germany .................... 219/121.63 |
| 4313287A1 | 4/1993 | Germany . |
| 61-140842 | 6/1986 | Japan . |
| 63-171288 | 7/1988 | Japan . |
| 1-273685 | 11/1989 | Japan . |
| 2-268989 | 11/1990 | Japan . |
| 4-284924 | 10/1992 | Japan . |
| 5-079990 | 3/1993 | Japan . |
| 6-269966 | 9/1994 | Japan ........................ 219/121.63 |
| 8-281457 | 10/1996 | Japan . |
| 9-010970 | 1/1997 | Japan . |
| WO9303881 | 8/1992 | WIPO . |

OTHER PUBLICATIONS

Reference C (Translation from attached Article in Japanese, 1 page) "Light Dispersing Technique Handbook" published on Jan. 20, 1997, second revision, pp. 328 to 330.

*Primary Examiner*—Geoffrey S. Evans
*Attorney, Agent, or Firm*—Michael S. Yatsko

[57] ABSTRACT

A method for monitoring the quality of a laser process such as a laser welding process includes monitoring the light emitted from the weld plasma above the surface of the workpiece irradiated by the laser beam. The intensity of the light emitted from the plasma is compared to a predetermined value of the light emission as determined under process and workpiece conditions that produce welds of acceptable quality. Variations of the monitored light intensity greater than a preselected value can be valuated as unacceptable welds. Such variations can be caused by changes in the laser beam power, the workpiece speed, laser focusing problems, insufficient shield gas flow, workpiece deformation and weld contamination. The process monitors the light emission for a selected range of wavelengths that correspond to the major emission peaks of the light spectrum. The method enables in-process control of laser processes.

15 Claims, 27 Drawing Sheets

METHOD FOR MONITORING LASER WELD QUALITY VIA PLASMA LIGHT INTENSITY MEASUREMENTS

BACKGROUND

The present invention is directed to the field of materials processing using lasers and, more particularly, to a method and apparatus for monitoring in-process laser weld quality via plasma light intensity measurements.

High power lasers are commonly used for materials working processes such as laser welding, cutting, drilling and heat treating. These processes provide a number of advantages over conventional welding processes including speed, consistency and weld quality.

During laser materials working processes, the laser beam is directed to impinge onto a workpiece, which becomes heated and eventually melts and then vaporizes. This vapor and the surrounding gases are ionized by the extreme heat and form a plasma plume between the laser and the workpiece. The plasma can be controlled by shield gas flow. Weld quality is affected by the instability of the plasma formation and by instabilities in process operating conditions such as fluctuations in the laser beam power and shield gas flow, and by workpiece defects such as weld zone contamination and physical deformation.

As the use of laser materials working processes increases in industry, the need for accurate in-process techniques for monitoring process quality also increases. In-process techniques provide important advantages over post-processing, non-destructive quality control techniques such as x-ray and ultrasonic analysis, and visual inspection, and over destructive quality control techniques such as metallography. Post-processing techniques are labor intensive and tedious, and do not enable real time monitoring and control of laser processing.

U.S. Pat. No. 5,304,774 discloses a laser welding monitoring method by use of a narrow-band filter to match an atomic emission line in the plasma. The measured light intensity is used to determine the penetration depth through a correlation of the light intensity to the cross-sectional area of the weld. A narrow-band fiber is not desirable because it reduces the transmitted light intensity be several orders of magnitudes. Furthermore, a poor penetration may not necessary yield lower plasma emission intensity as disclosed in the patent.

U.S. Pat. No. 5,272,312 teaches a laser monitoring method by simultaneously monitoring the infrared emission and UV emission from a workpiece surface. The angle of the optical axes of the UV detector is stated to be preferably at approximately 30° from the weld surface.

These known in-process techniques for monitoring laser processes are not fully satisfactory. Known techniques can falsely reject good parts (type I error) or fail to reject bad parts (type II error). Type I errors result in increased economic costs. Type II errors can be especially important in laser welding processes which form critical welds. The failure to detect defective critical welds can result in potentially defective parts being used in the final assemblies.

Thus, there is a need for a method of monitoring laser materials working processes that can (i) be performed in real time for in-process control; (ii) can accurately distinguish between good and bad welds and reduce Type I and Type II errors; and (iii) can be used to monitor various laser material processes.

SUMMARY

The present invention provides a method and apparatus for monitoring laser materials working processing that satisfies the above needs. Particularly, the present invention is (i) used in-process; (ii) accurately distinguishes between good and bad welds and, thus, reduces the rate of type I and type II errors; and (iii) can be used to monitor various laser materials working processes.

The method according to the present invention comprises monitoring a laser process in which a laser beam impinges onto a surface of an object and a surrounding plasma is produced. The process is typically a laser welding process. The process can optionally be, for example, a laser drilling or laser cutting process. The object is typically a workpiece. The method comprises the steps of providing a predetermined value representative of the intensity of light emitted from the plasma above the surface of the object. The predetermined value is derived from laser welding process conditions that correlate with acceptable quality welds. These conditions include "nominal" laser power and workpiece speed, sufficient shield gas flow, sufficient cleanliness at the weld, satisfactory physical condition of the workpiece, absence of undesirable trace contaminants in the workpiece material, and proper focusing of the laser onto the irradiated surface of the workpiece.

The emission spectrum of the light emitted from the plasma is analyzed to determine the spectral region that substantially encompasses the emission peaks in the emission spectrum of the greatest emission intensity. The selected spectral region is dependent on the composition of the workpiece.

A light filter having a transmission band covering at least a portion of the spectral region is selected for use with the monitoring equipment. The light filter is positioned relative to the surface of the workpiece to receive emitted light and to transmit wavelengths substantially within the transmission band. Preferably, the light filter has a transmission band that substantially covers the spectral region.

The light transmitted through the light filter is monitored during the laser welding process to determine the light intensity. The light is preferably monitored using a broadband blue-violet radiometer. The light can optionally be monitored using a broad-band UV radiometer or a narrow-band radiometer. The monitored intensity is compared to the predetermined value of the intensity of light. The weld is considered acceptable for values of the monitored intensity of the light that fall within a preselected range of the predetermined value of the intensity of light. The method allows the in-process monitoring of the overall quality of the welding process.

The light emitted from the plasma is collected during the laser welding process using a focusing lens having an optical axis (i) oriented horizontally or at a small angle relative to the surface of the workpiece, and (ii) disposed close to the surface. The light transmitted through the light filter is typically monitored using an ultraviolet-enhanced silicon photodiode.

The predetermined value of the intensity of light is typically a time-averaged value. During monitoring of the laser process, the intensity of the light transmitted through the light filter is also typically a time-averaged value. The time-averaged intensity of the light can be selectively determined for only a portion of the laser welding process, or for the entire duration of the laser process. The time-averaged value is preferably calculated for the steady state portion of the welding process during which the plasma is most stable.

The time-averaged light intensity can be correlated with the overall quality of the laser welding process. For example, this value can be correlated with (i) the speed of movement of the workpiece relative to the laser beam; (ii) the power of the laser beam; (iii) focusing of the laser beam onto the surface of the workpiece; (iv) the presence of contamination at the weld; (v) sufficient flow of a shield gas about the plasma; and (vi) the level of physical deformation of the workpiece.

Alternately, the intensity of the light transmitted through the light filter can be monitored in the form of a temporal trace of the intensity. The temporal trace represents the change in intensity of the emitted light during the laser process. Sudden changes in the intensity, as represented by "dips" and "spikes" in the temporal trace, can be correlated with overall weld problems and with localized weld problems.

Dips in the temporal trace can be correlated, for example, with (i) the speed of movement of the object relative to the laser beam; and (ii) the power of the laser beam; (iii) proper focusing of the laser beam onto the workpiece; (iv) the presence of contamination at the weld; (v) sufficient flow of a shield gas about the plasma; and (vi) the level of physical deformation of the workpiece.

DRAWINGS

These and other features, aspects and advantages of the present invention will become better understood from the following description, appended claims and accompanying drawings, where:

Figure 5:
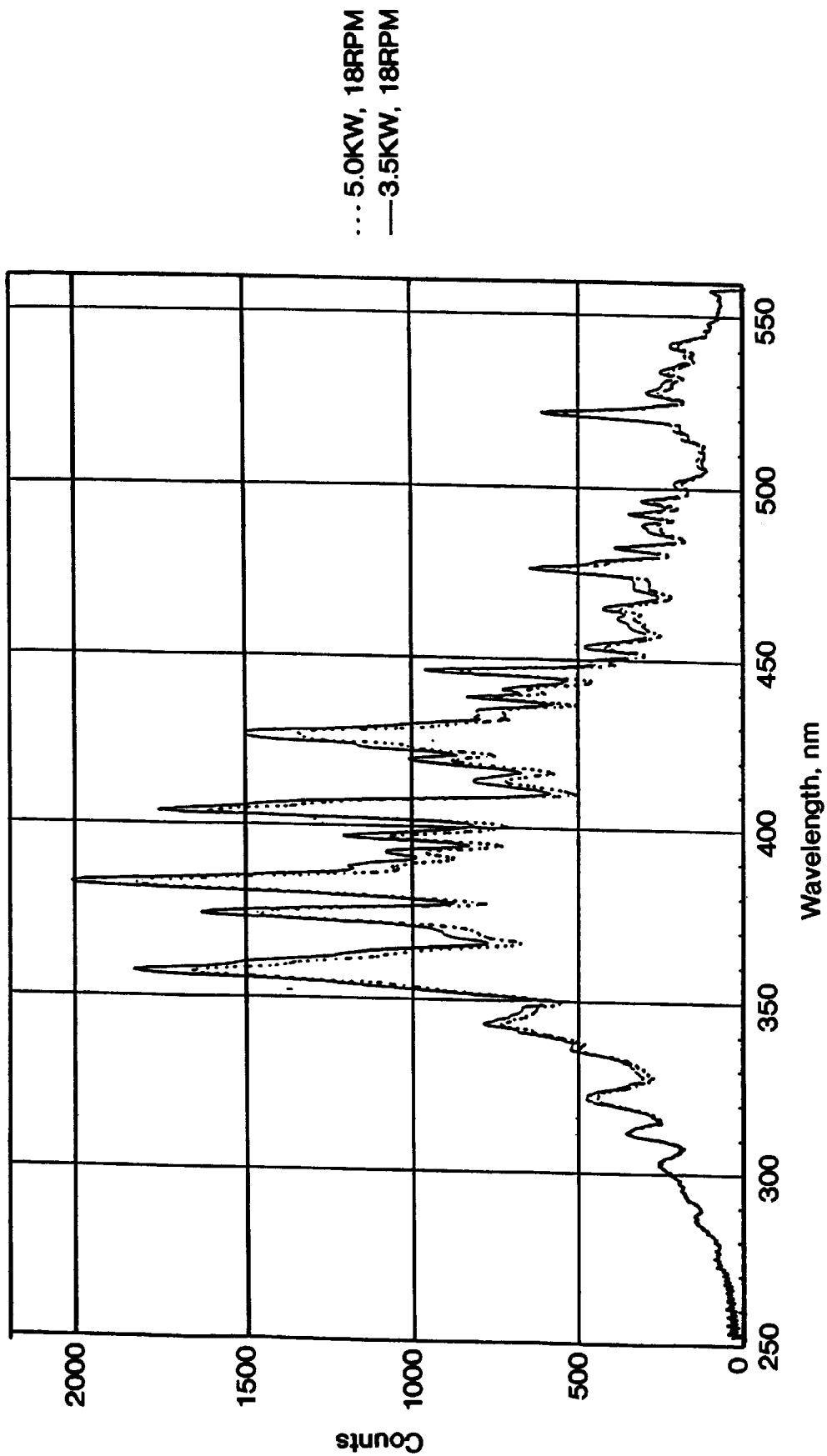
Figure 6:
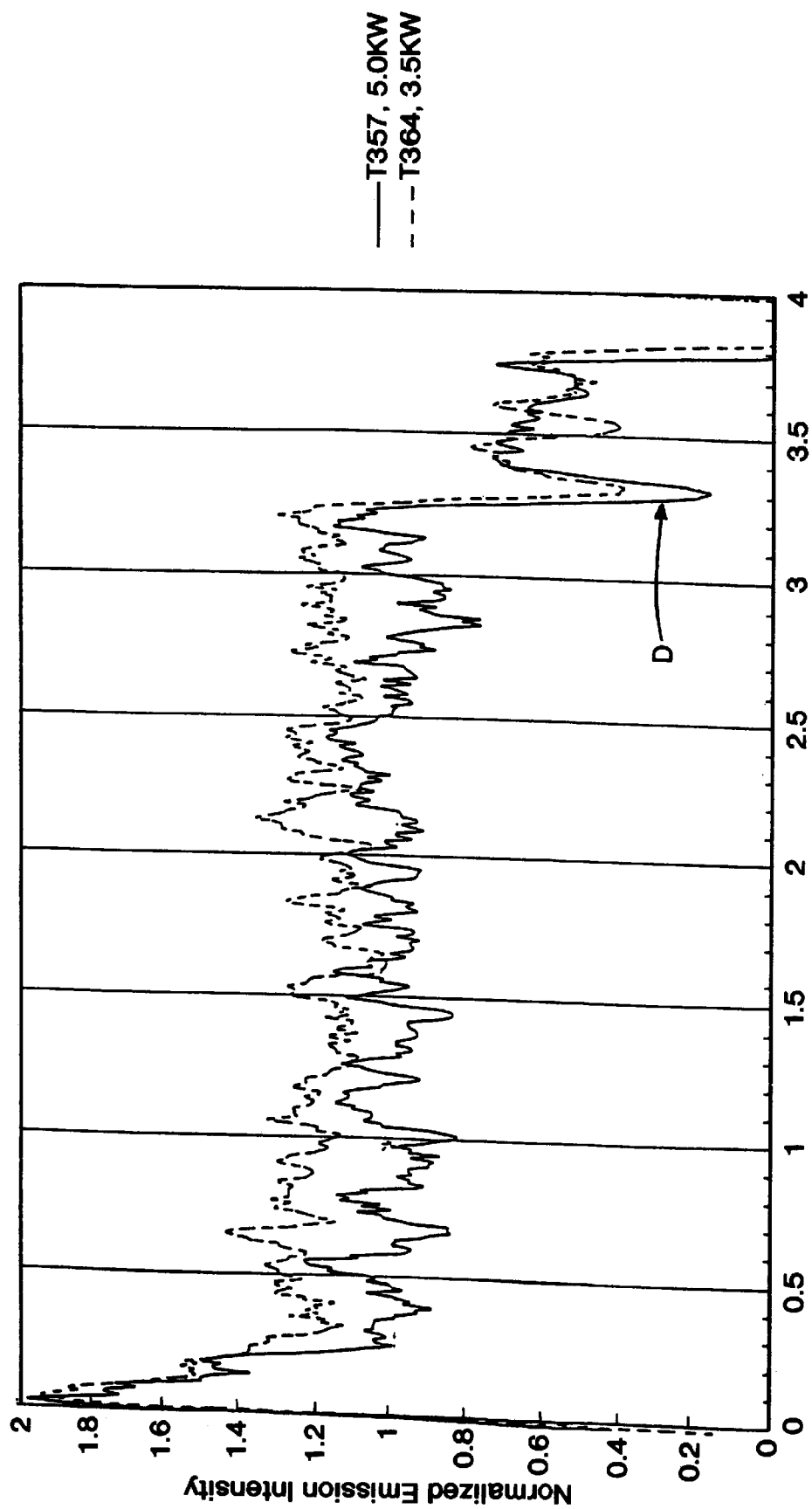
Figure 7:
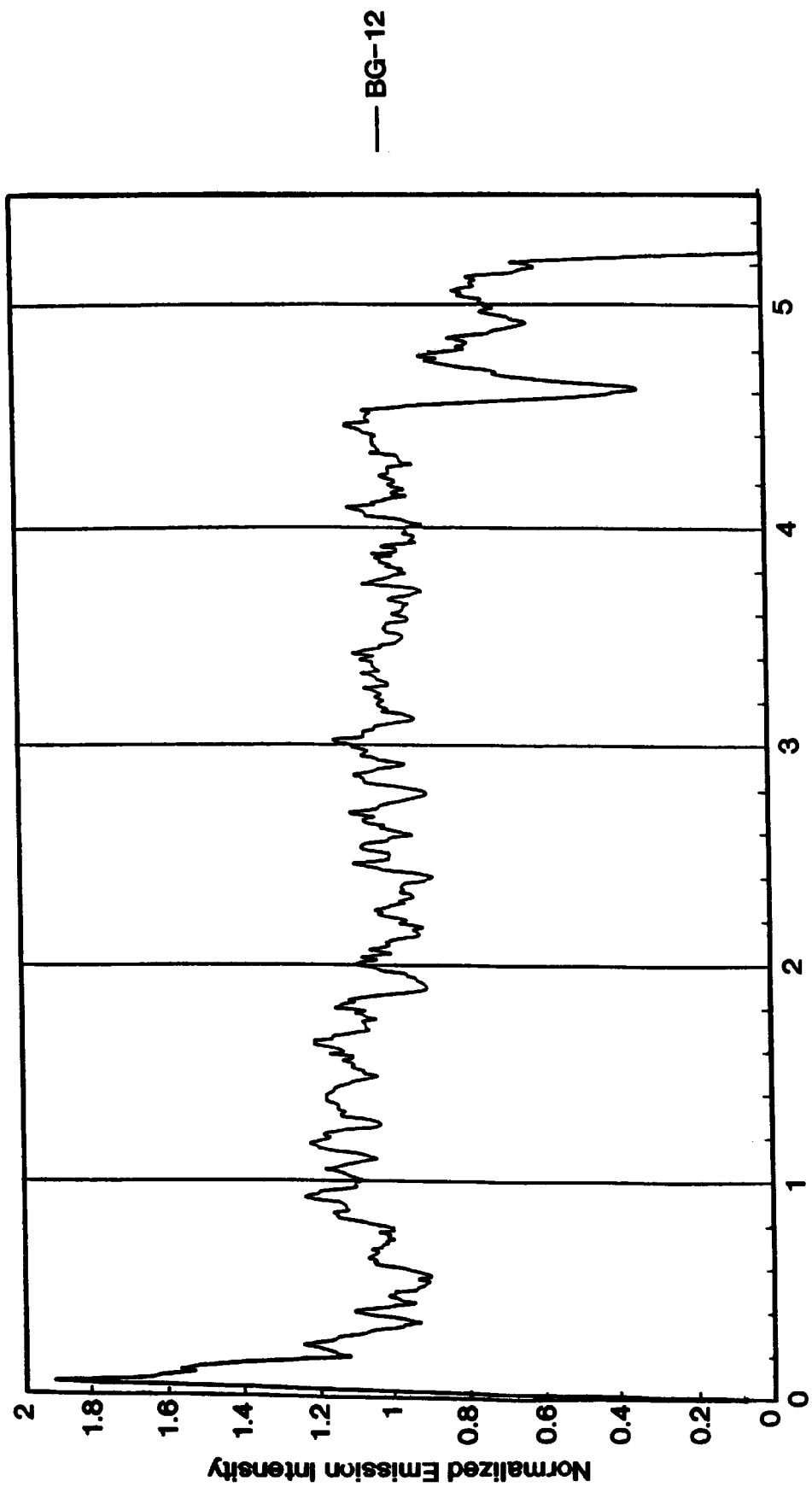
Figure 8:
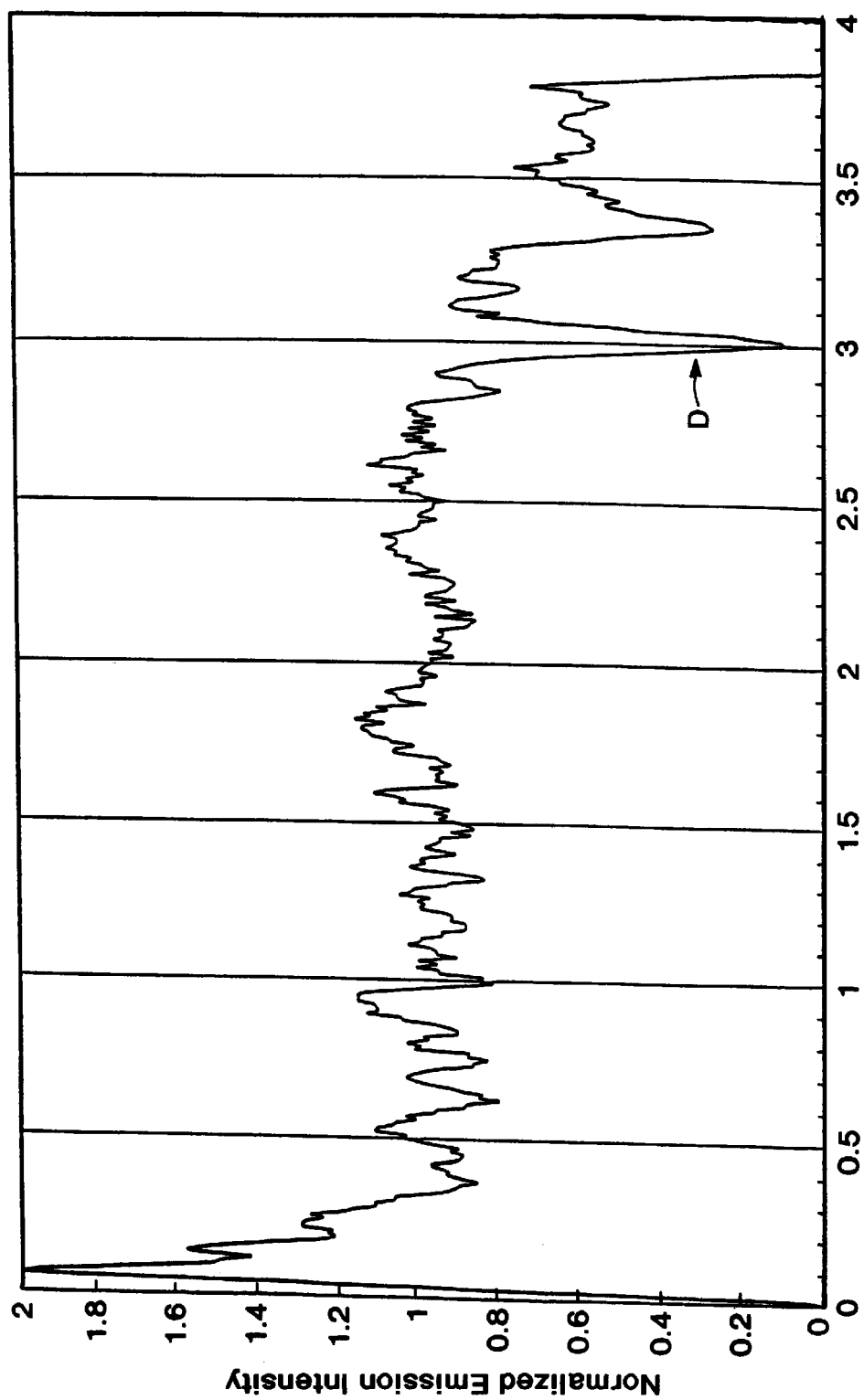
Figure 9:
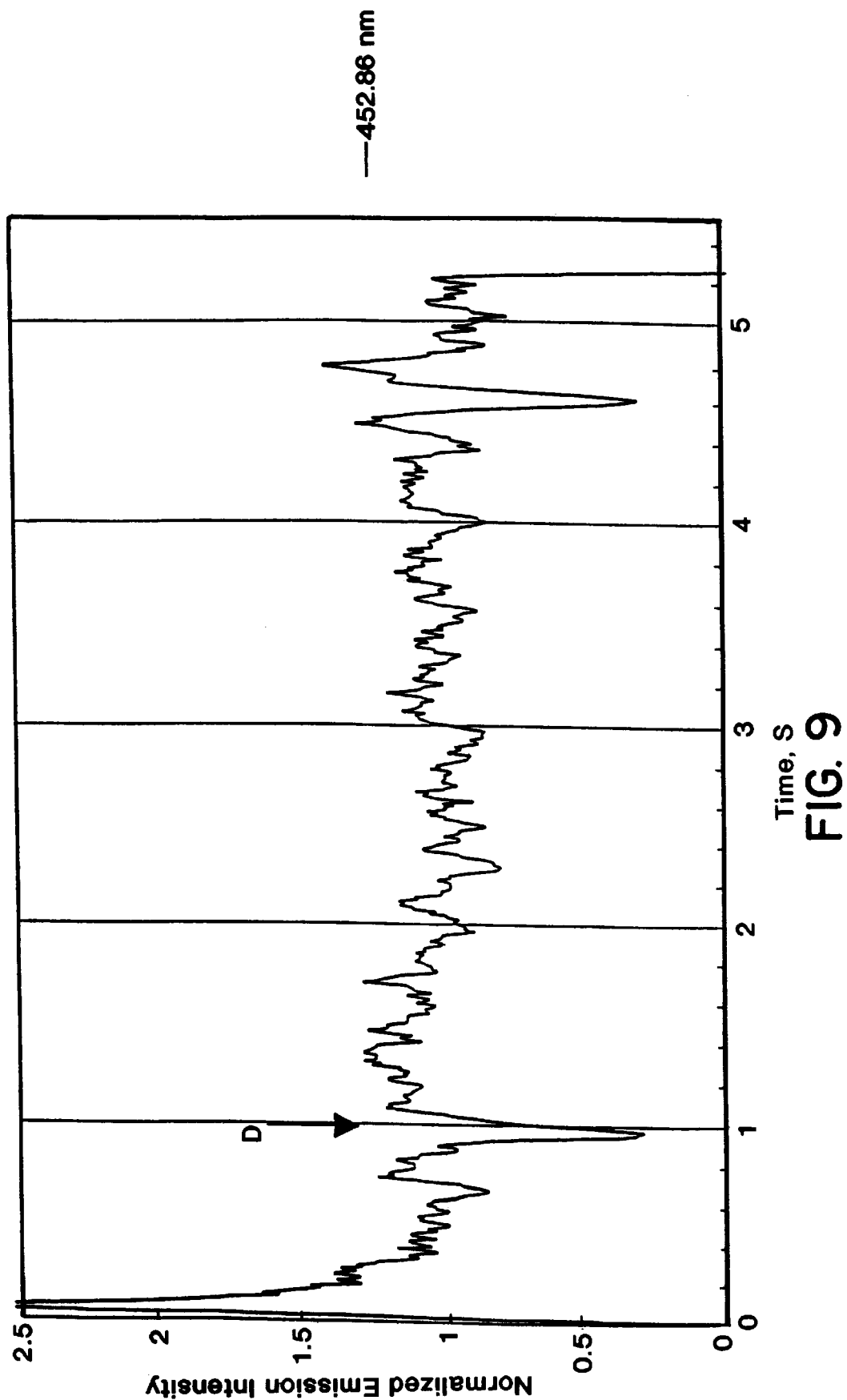
Figure 10:
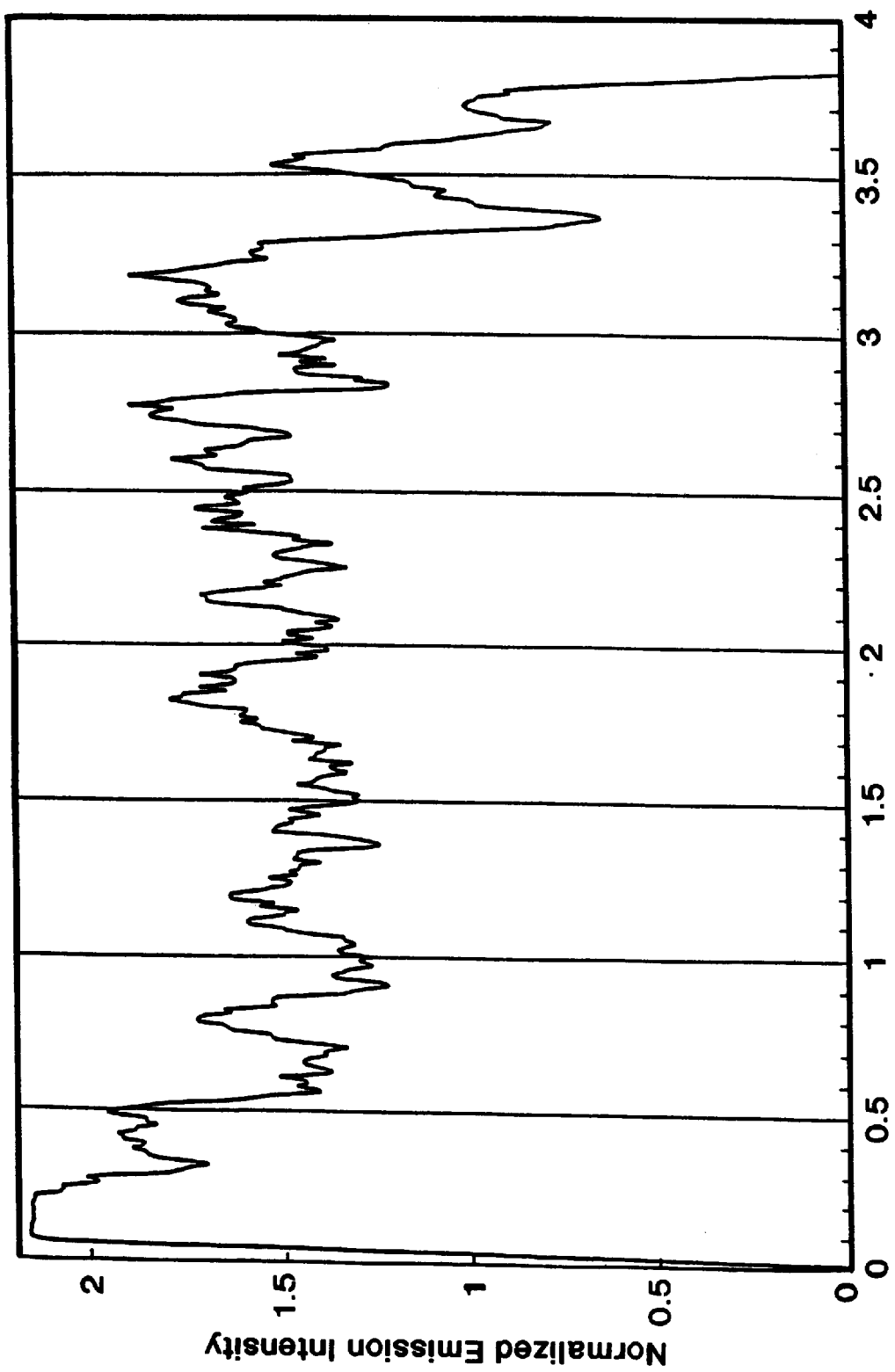
Figure 11:
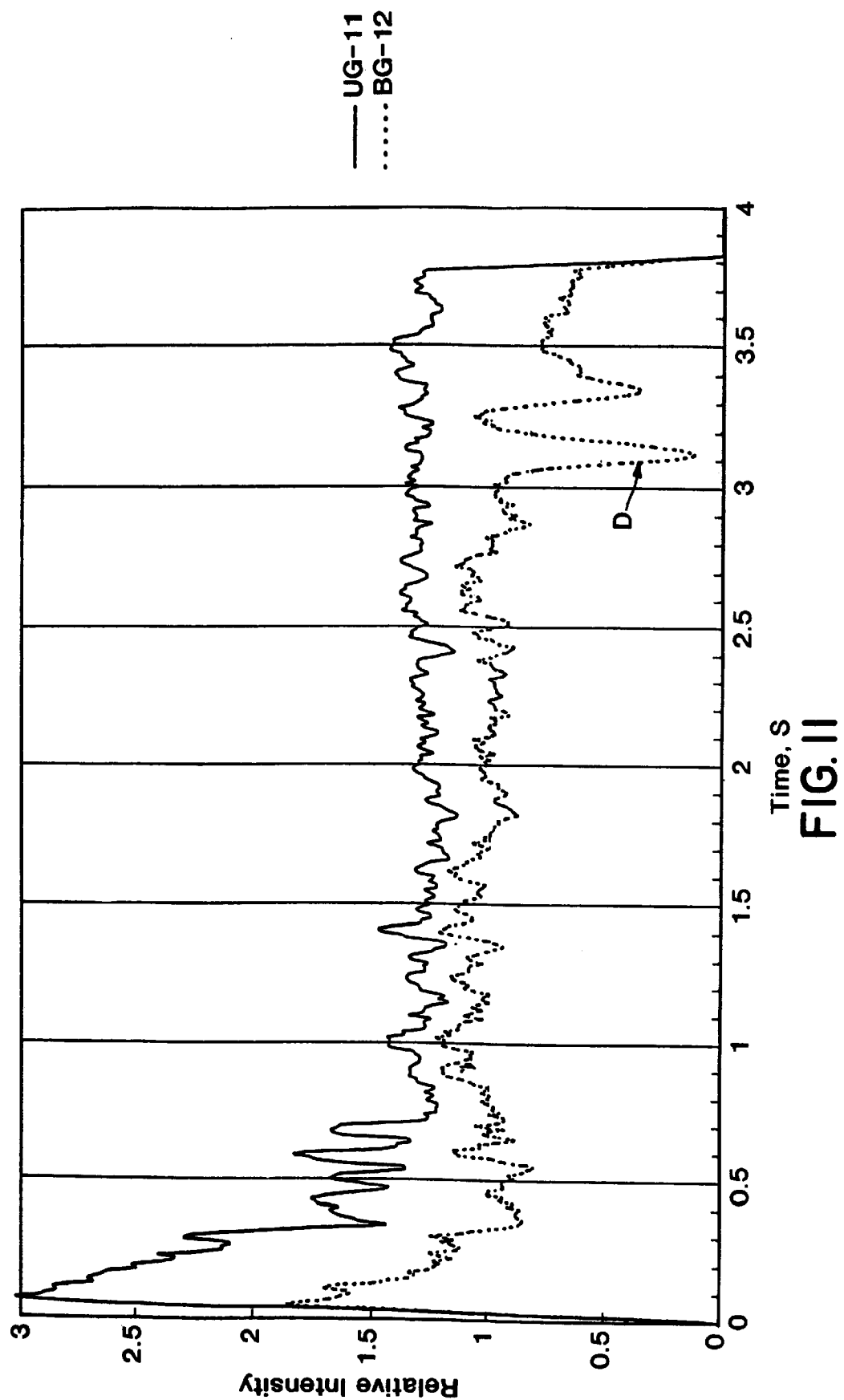
Figure 12:
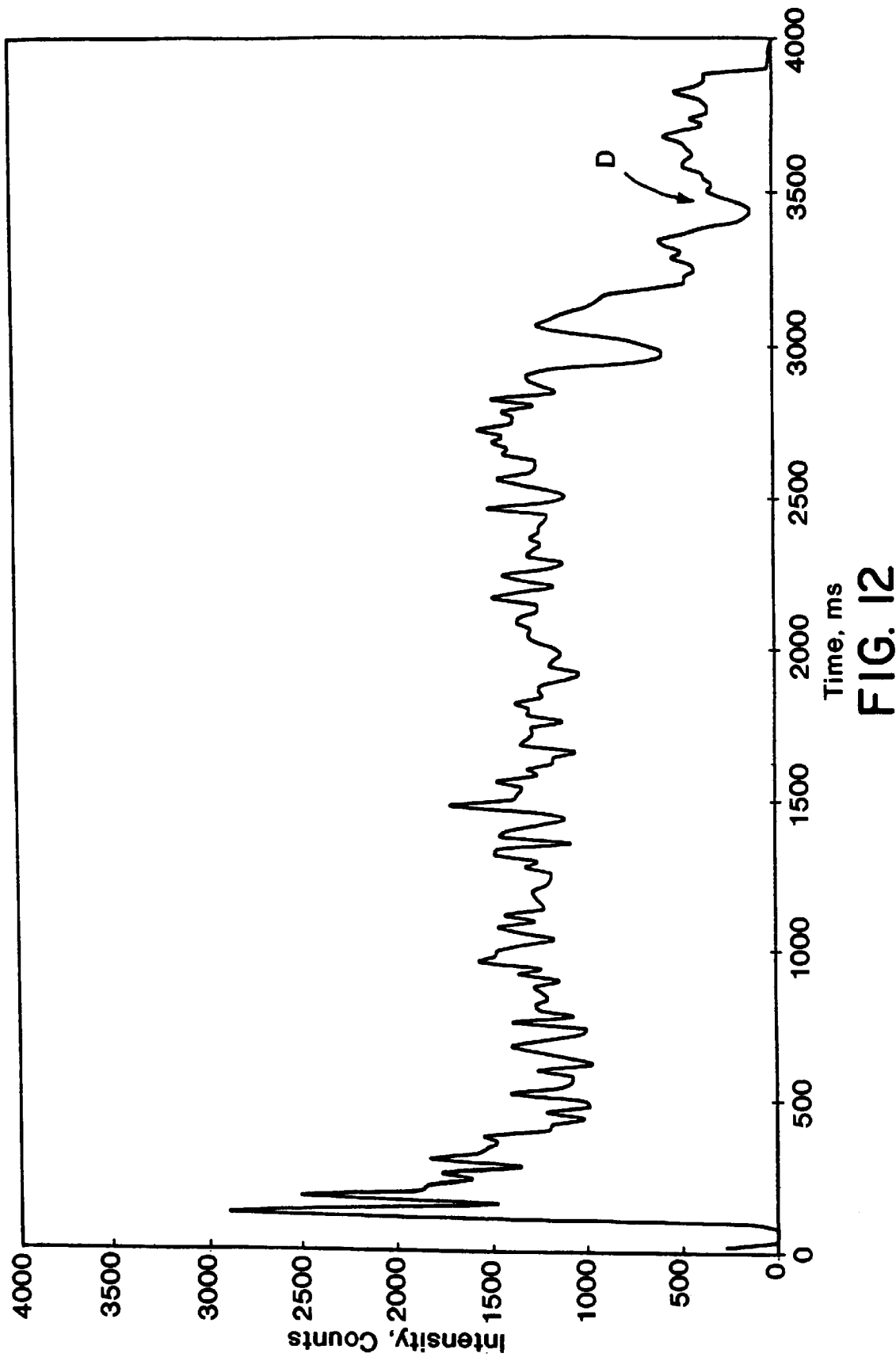
Figure 13:
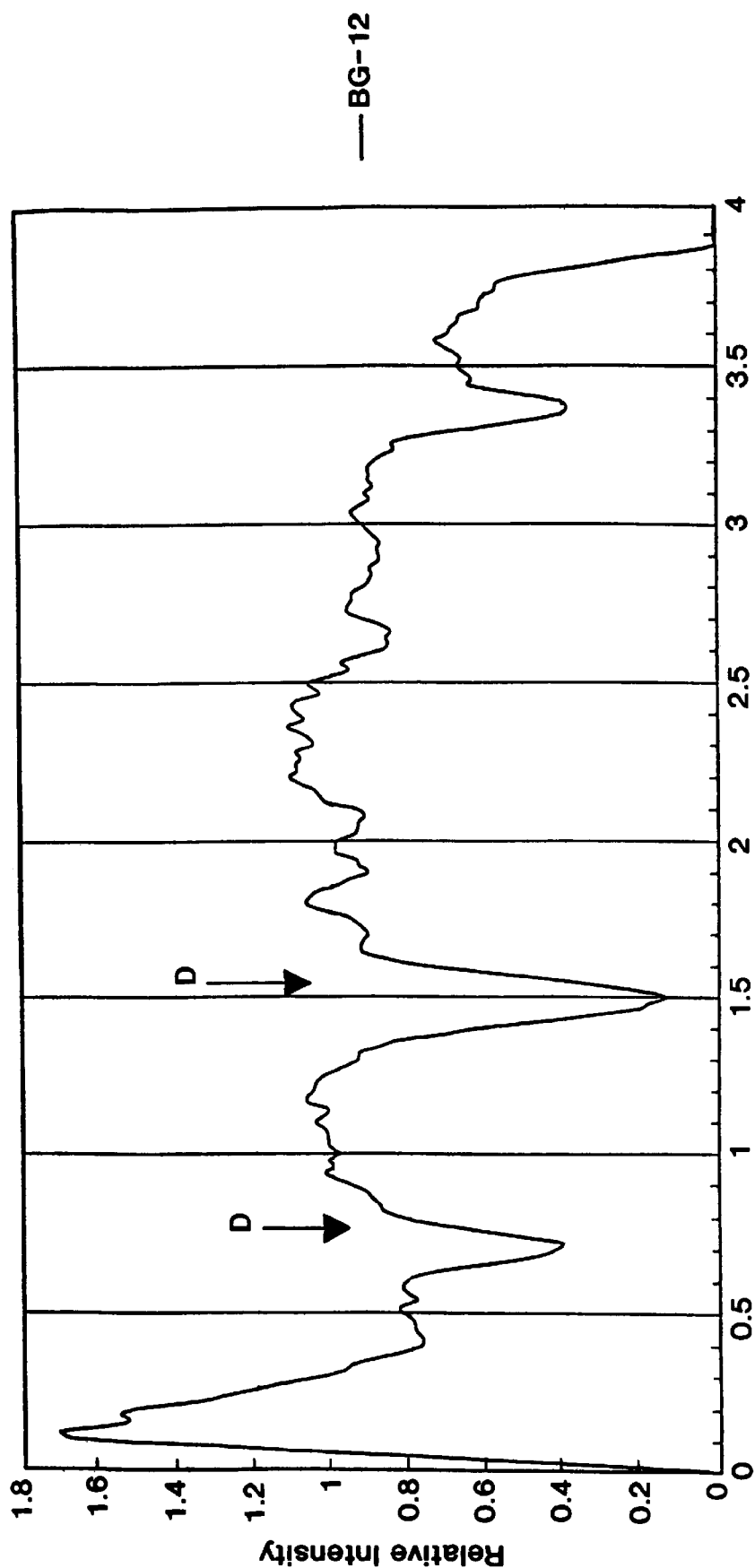
Figure 14:
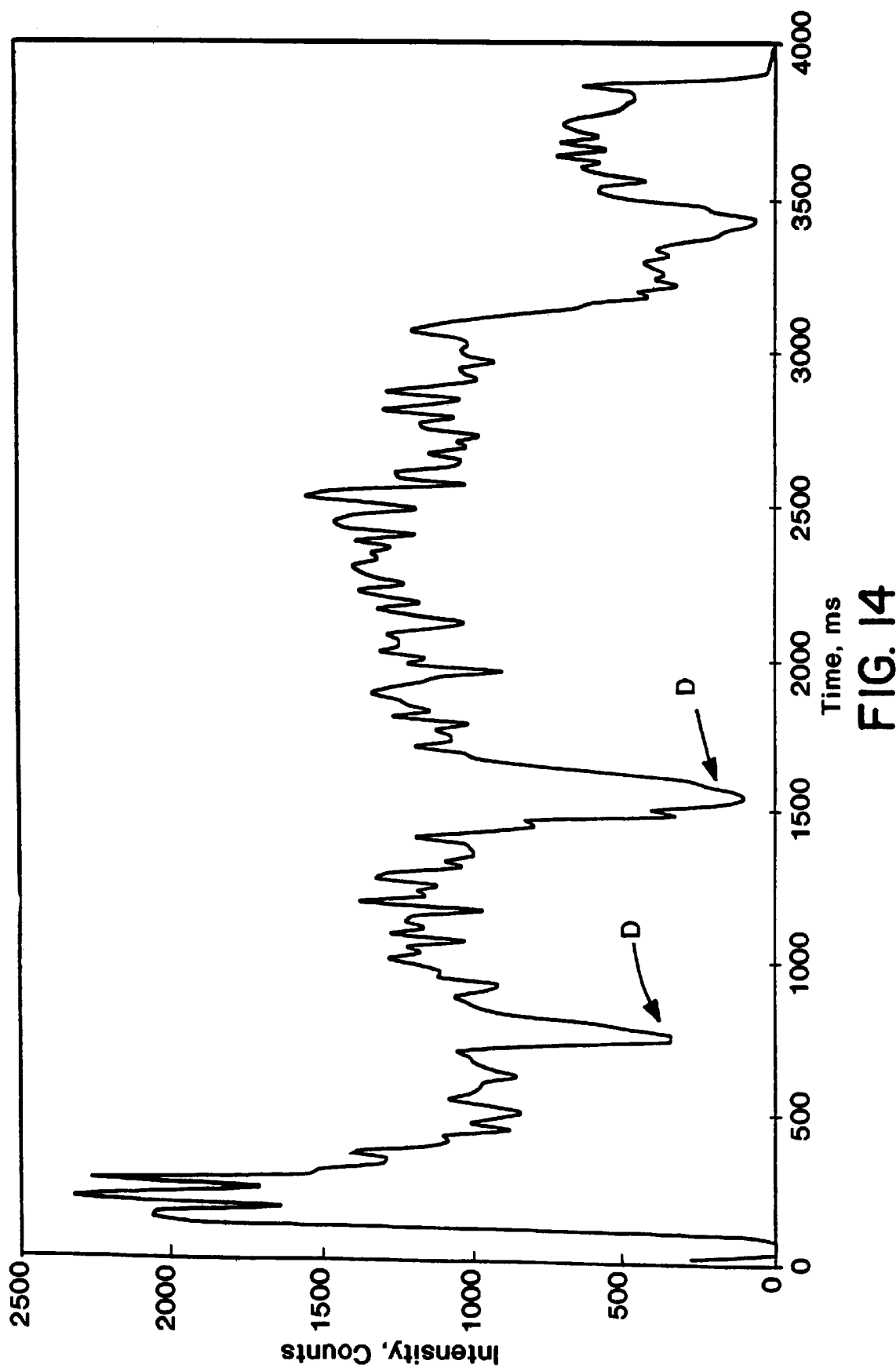
Figure 15:
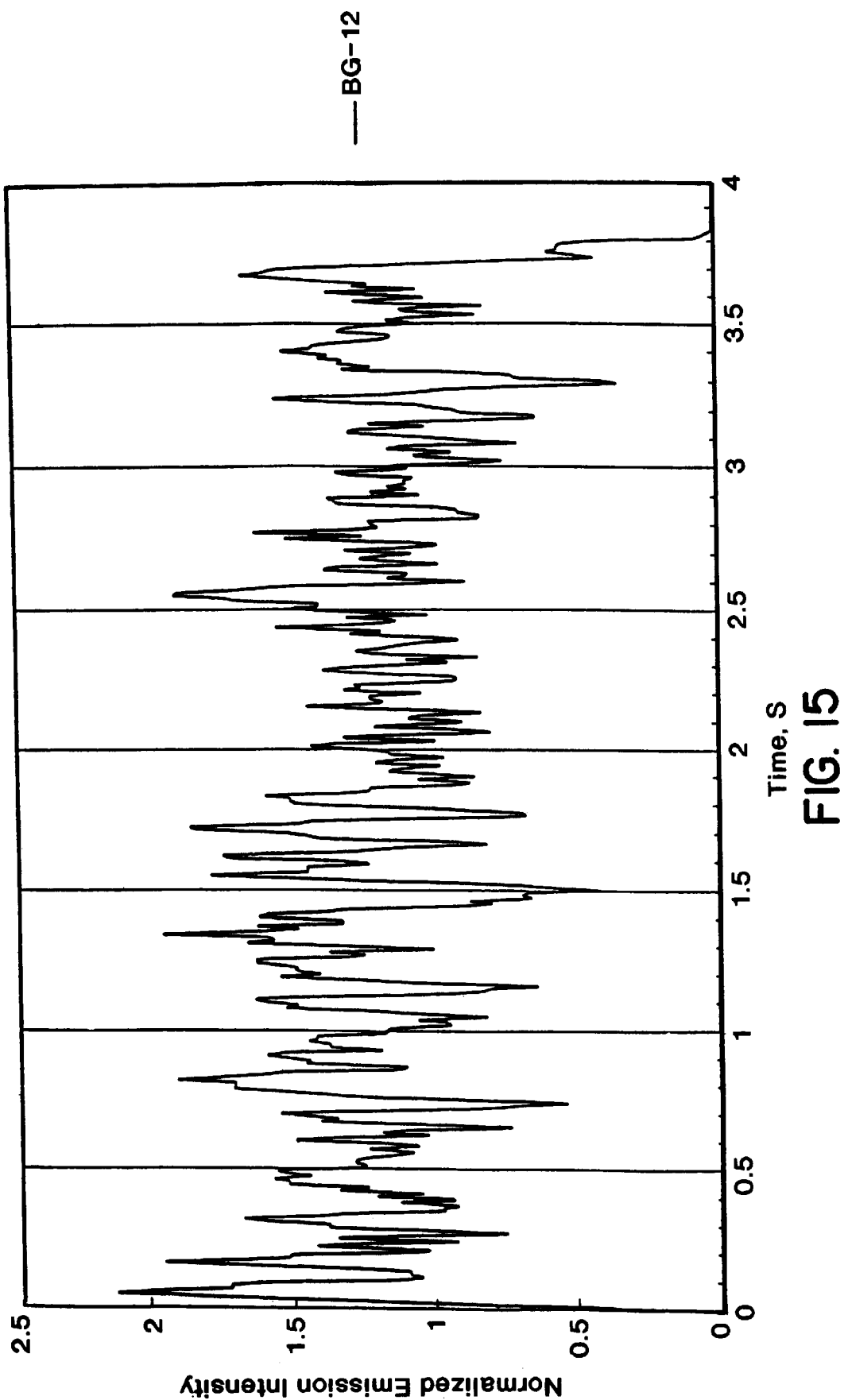
Figure 16:
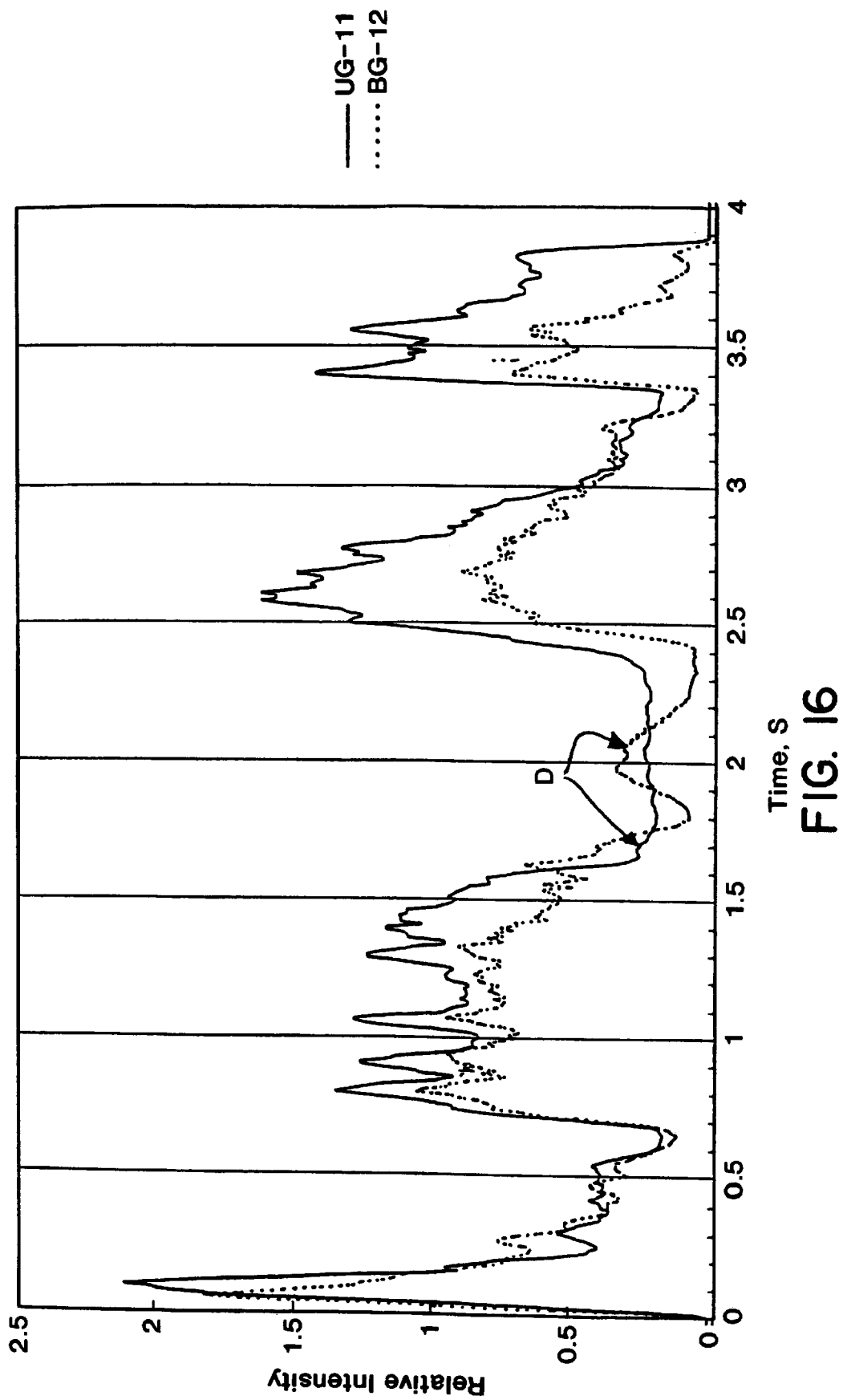
Figure 17:
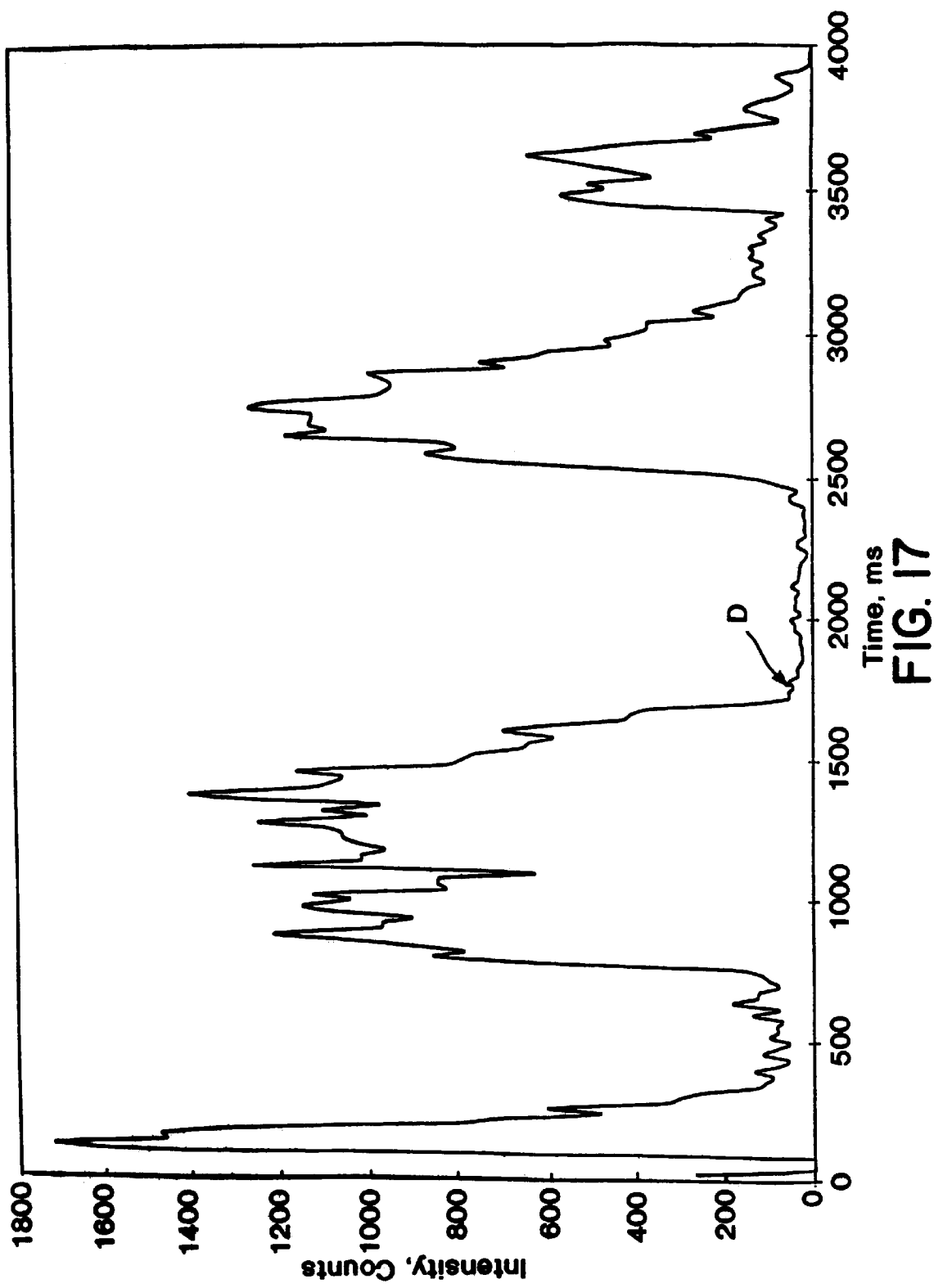
Figure 18:
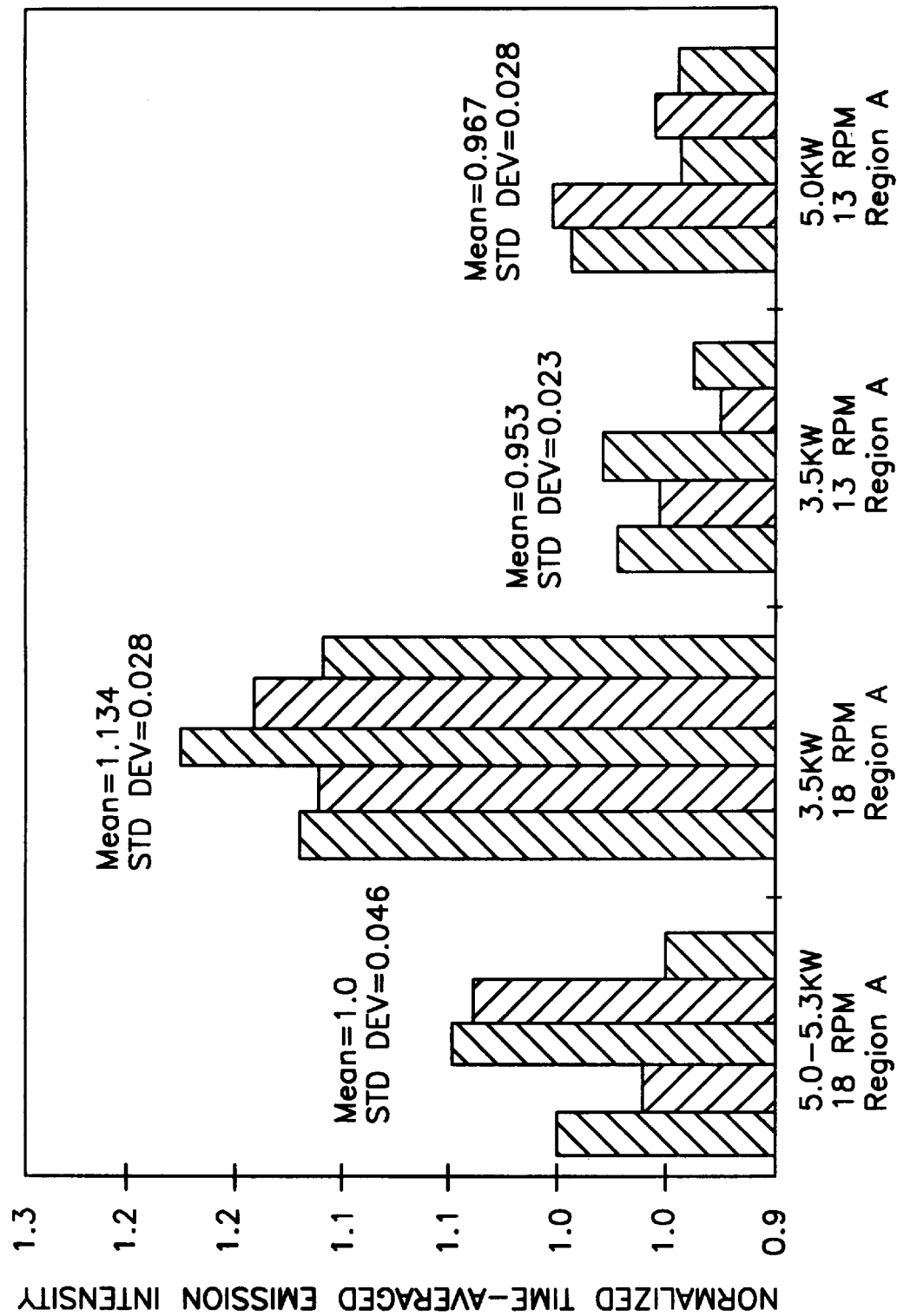
Figure 19:
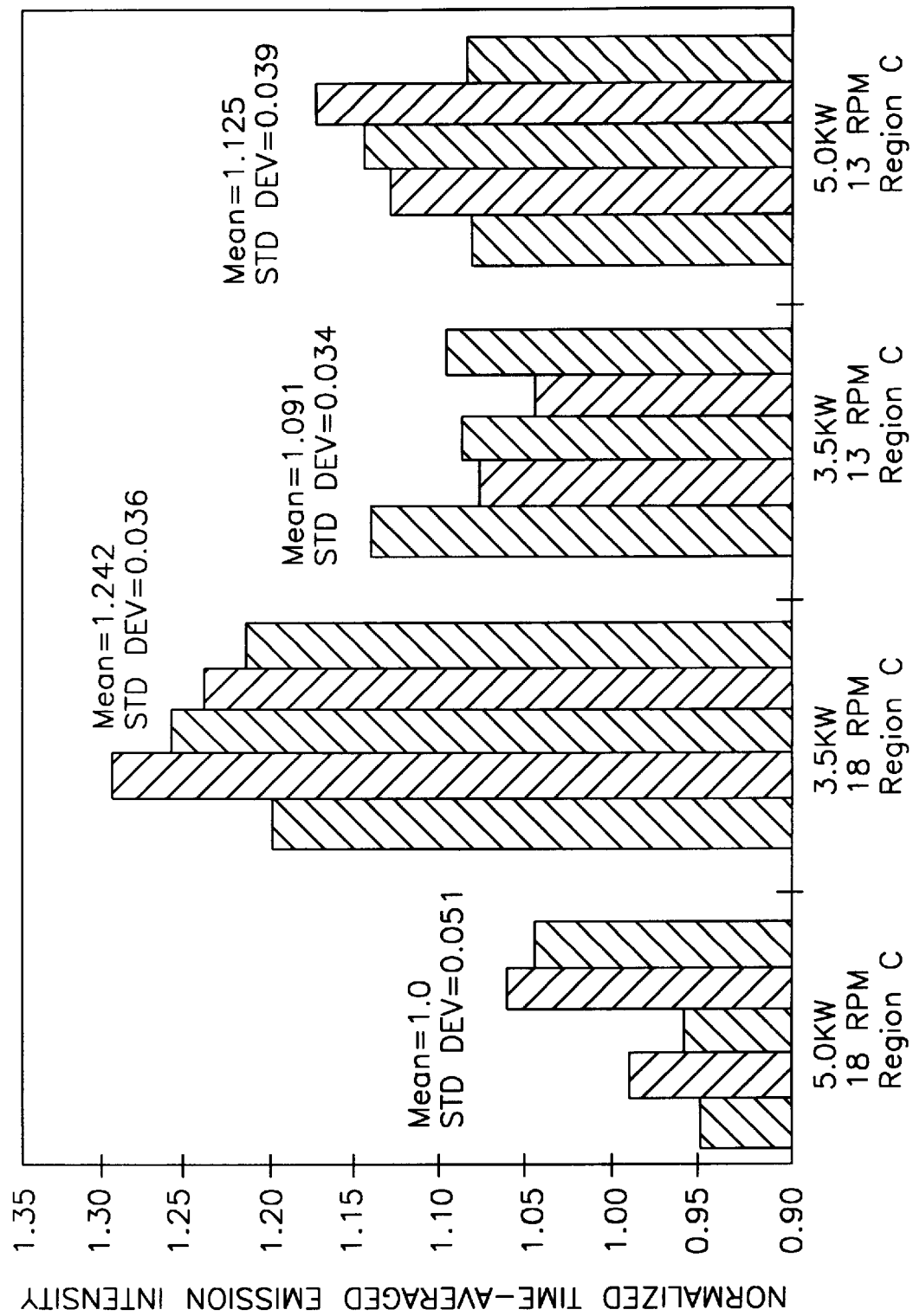
Figure 20:
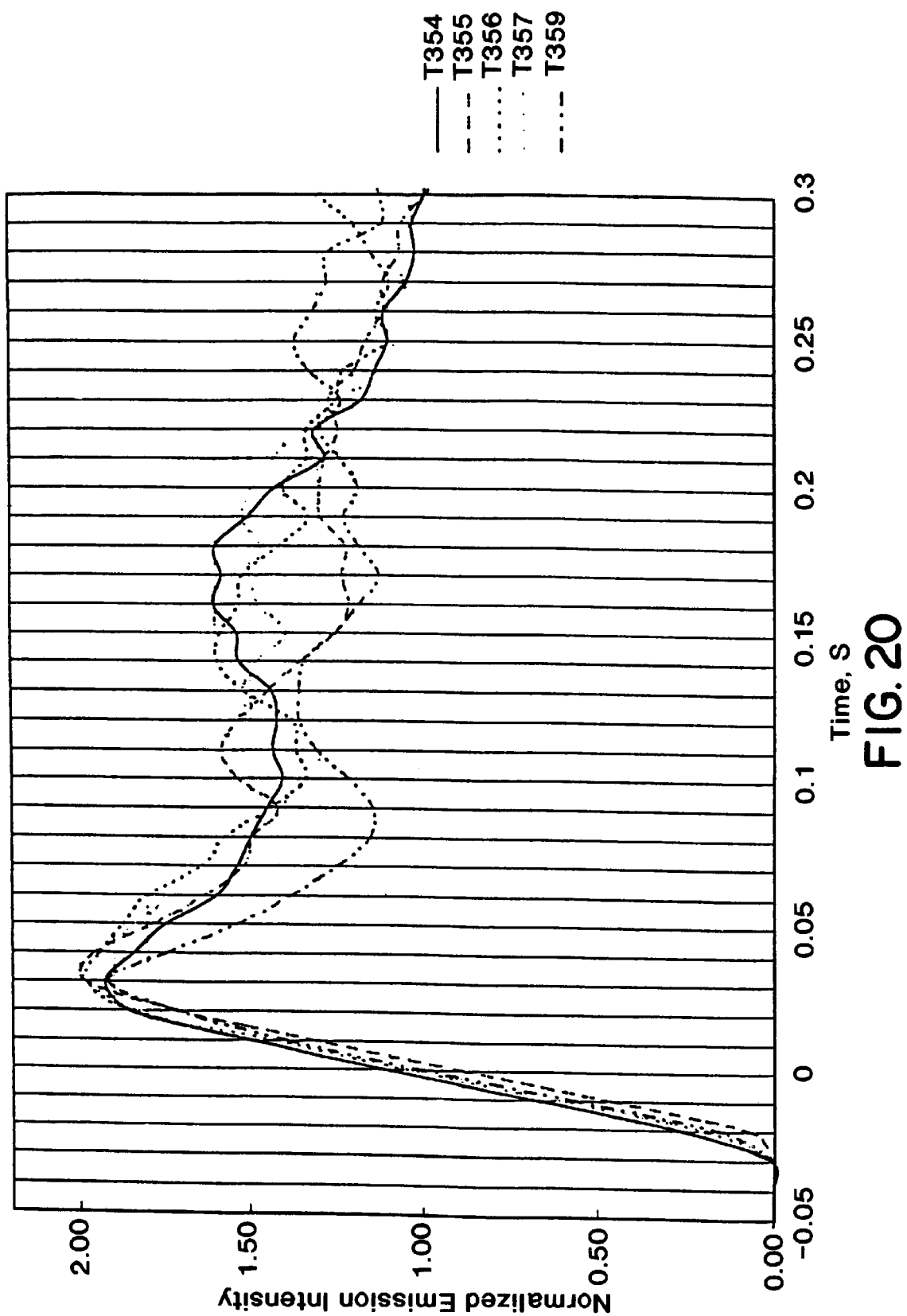
Figure 21:
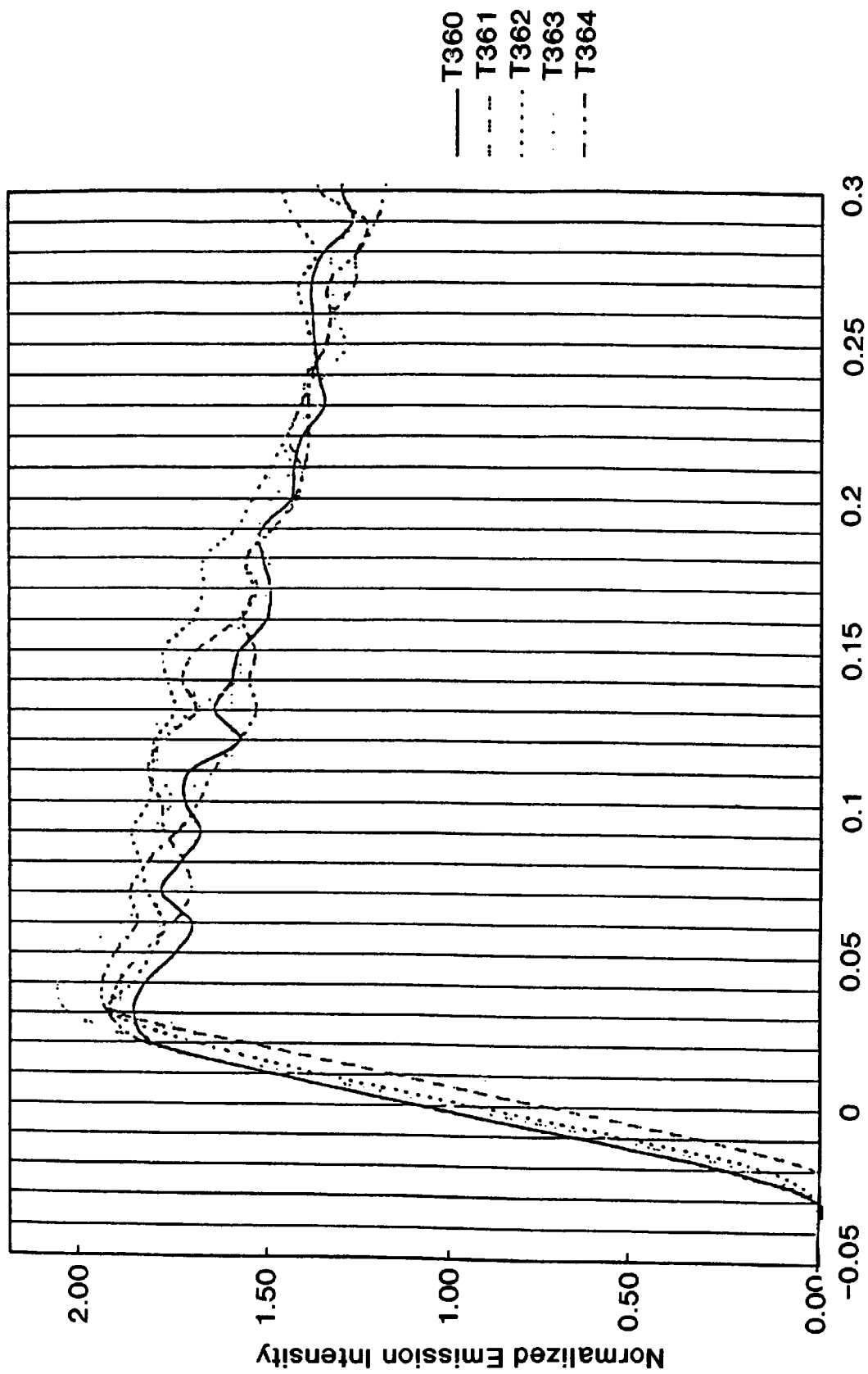
Figure 22:
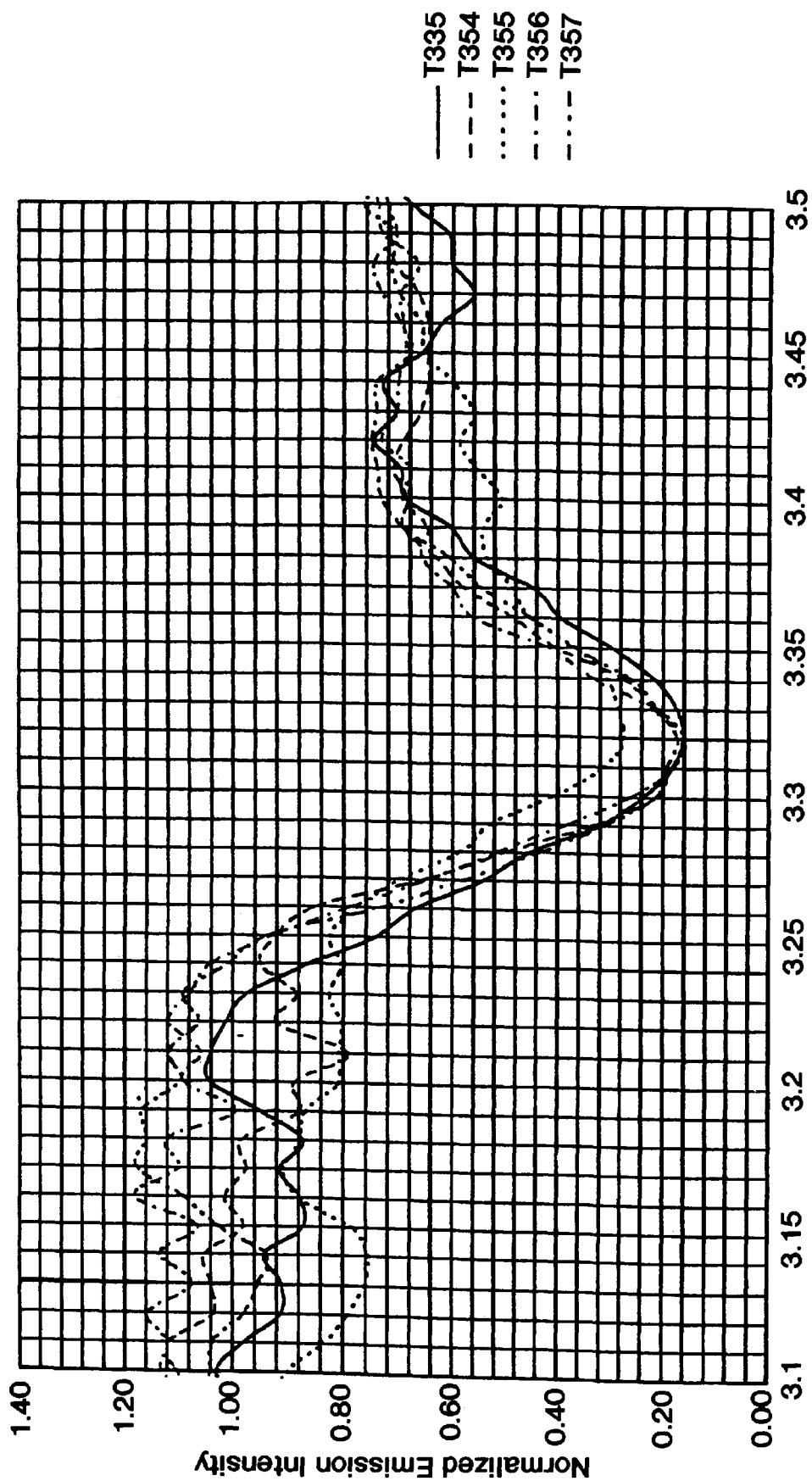
Figure 23:
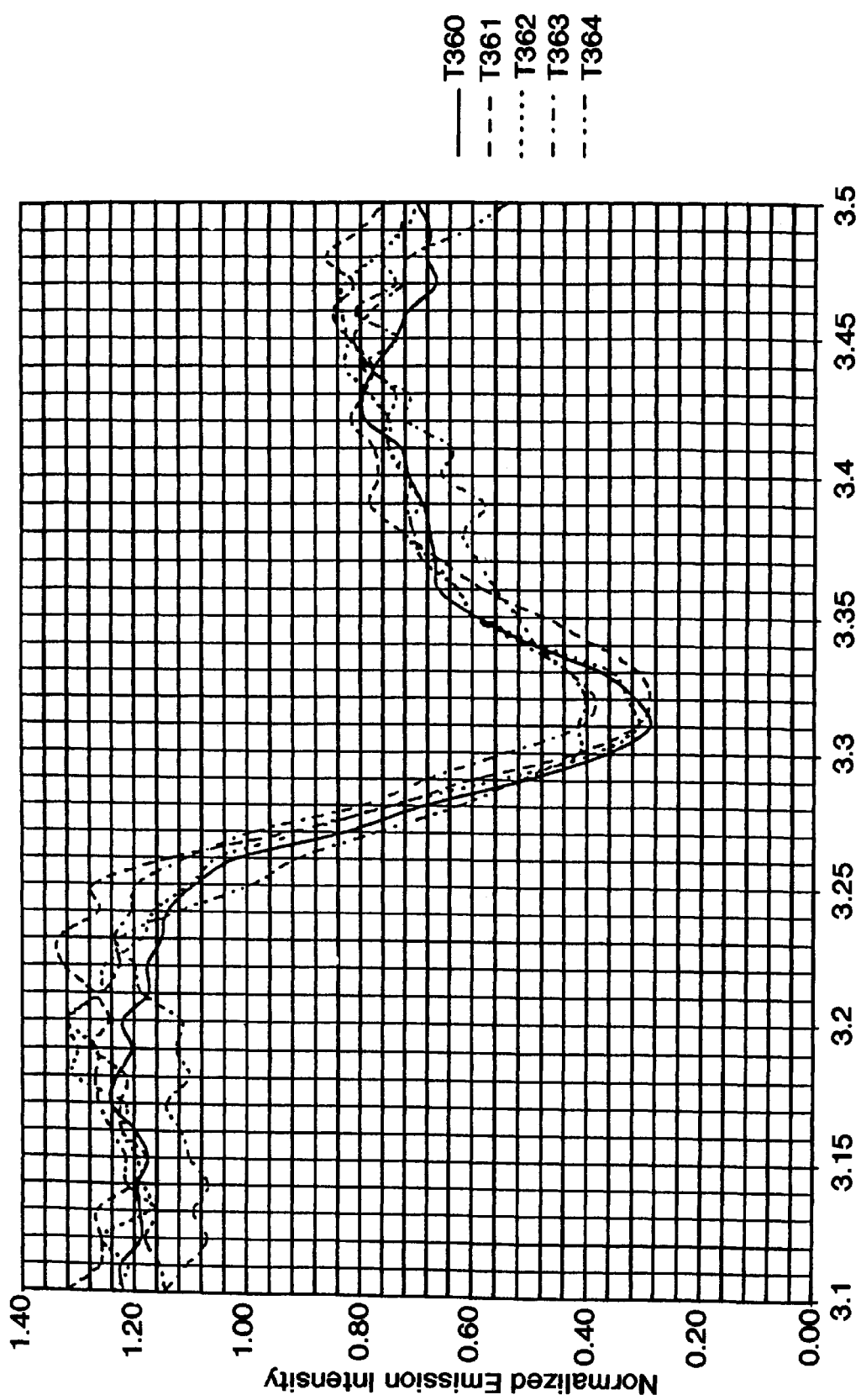
Figure 24:
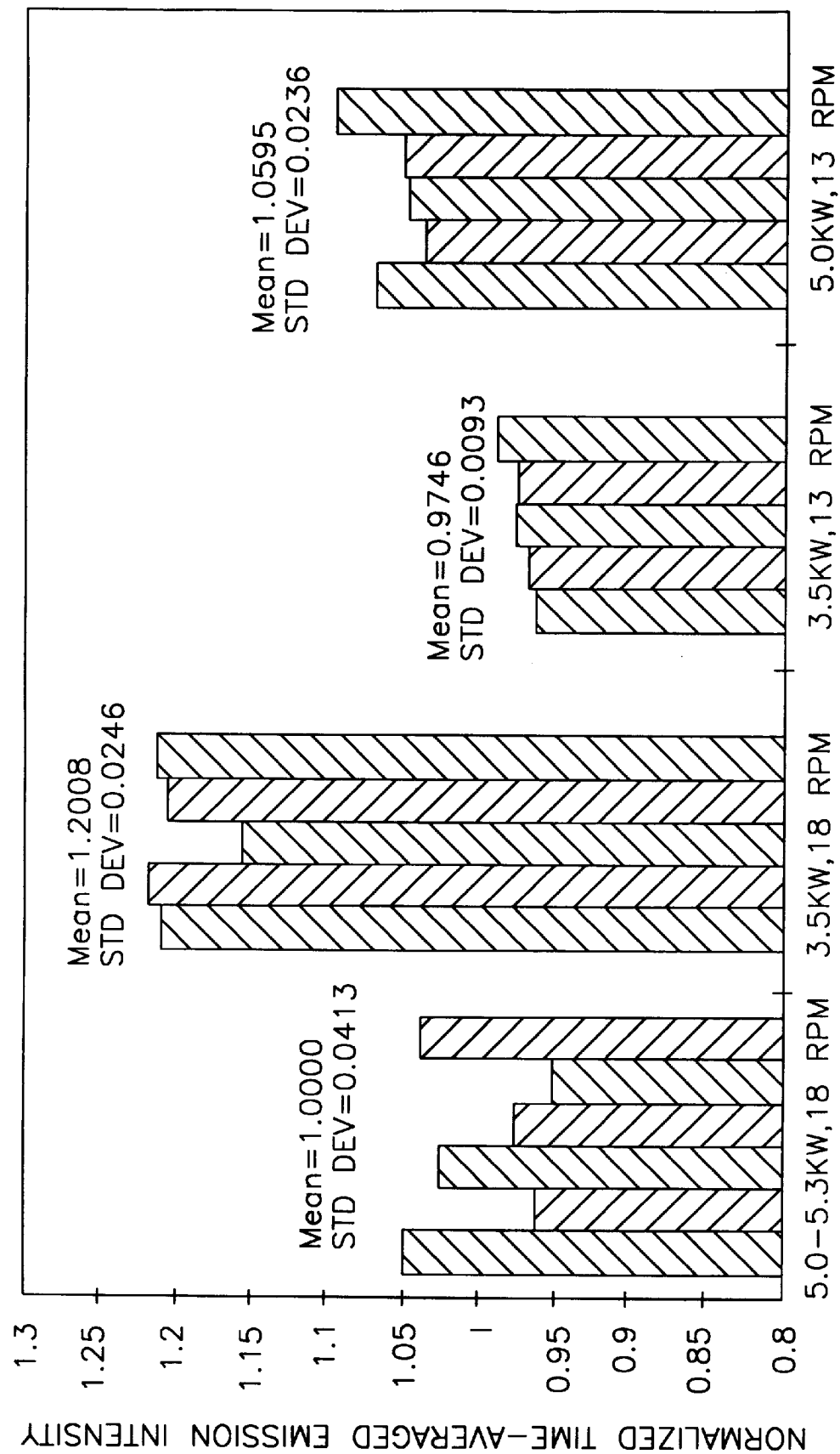
Figure 25:
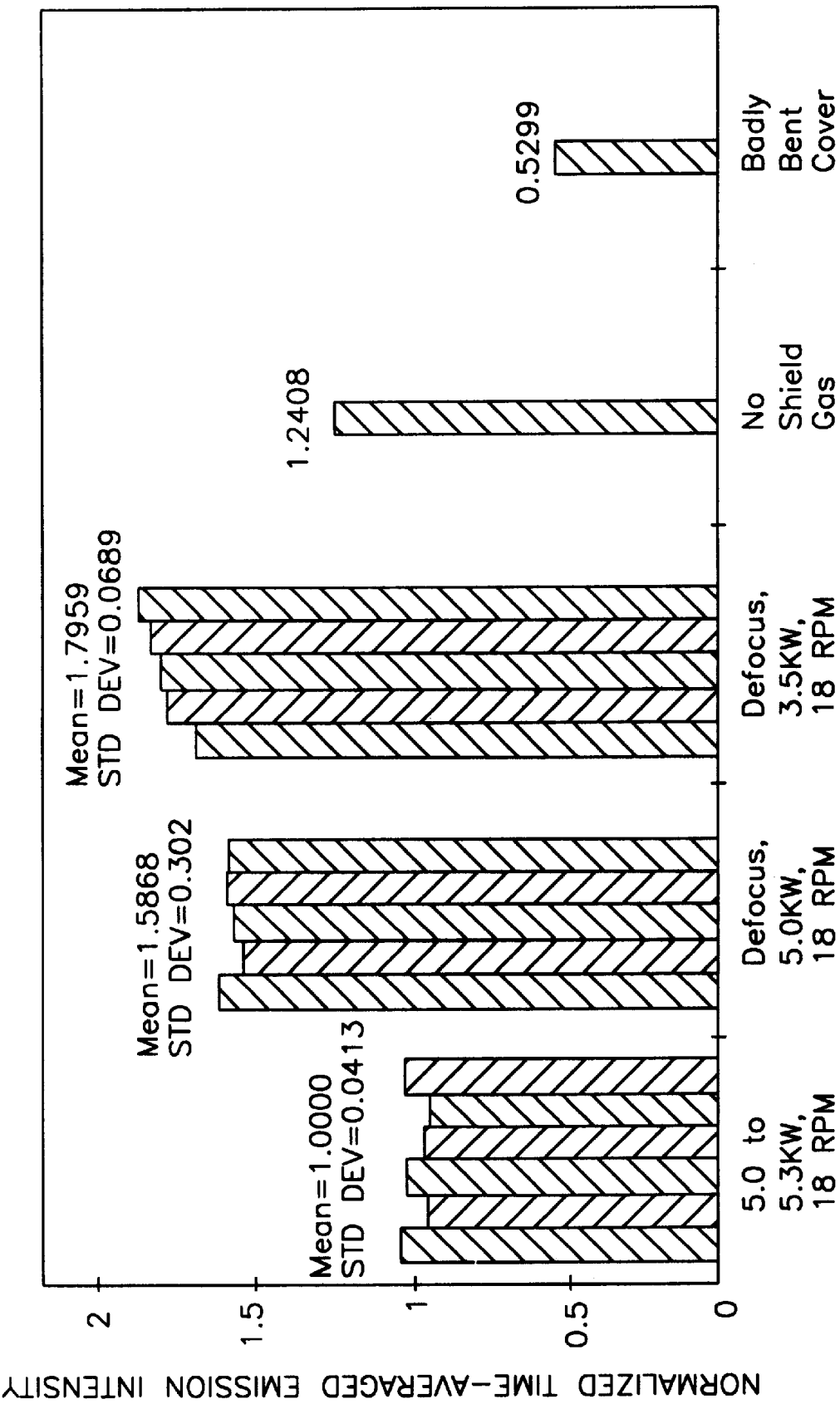
Figure 26:
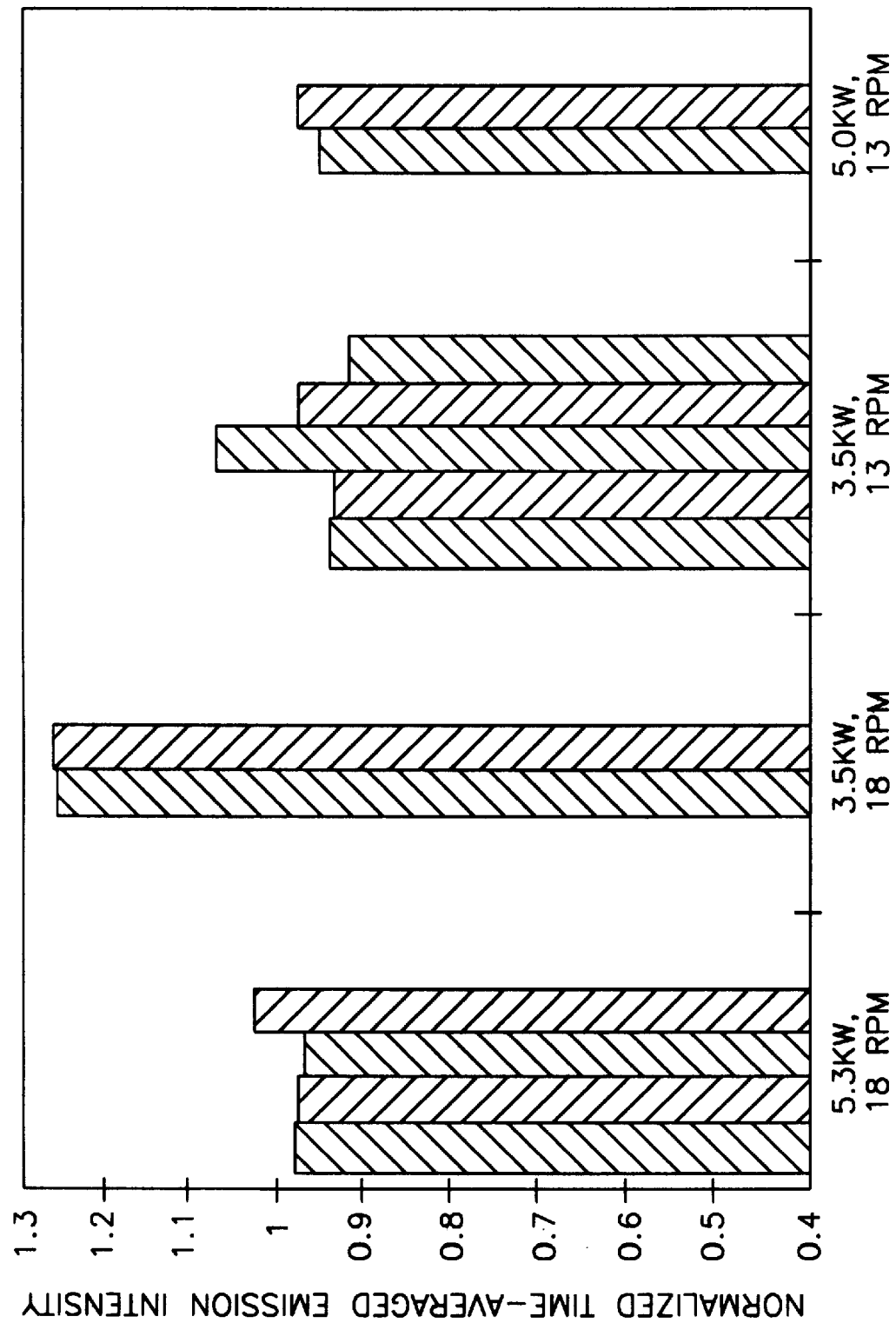
Figure 27:
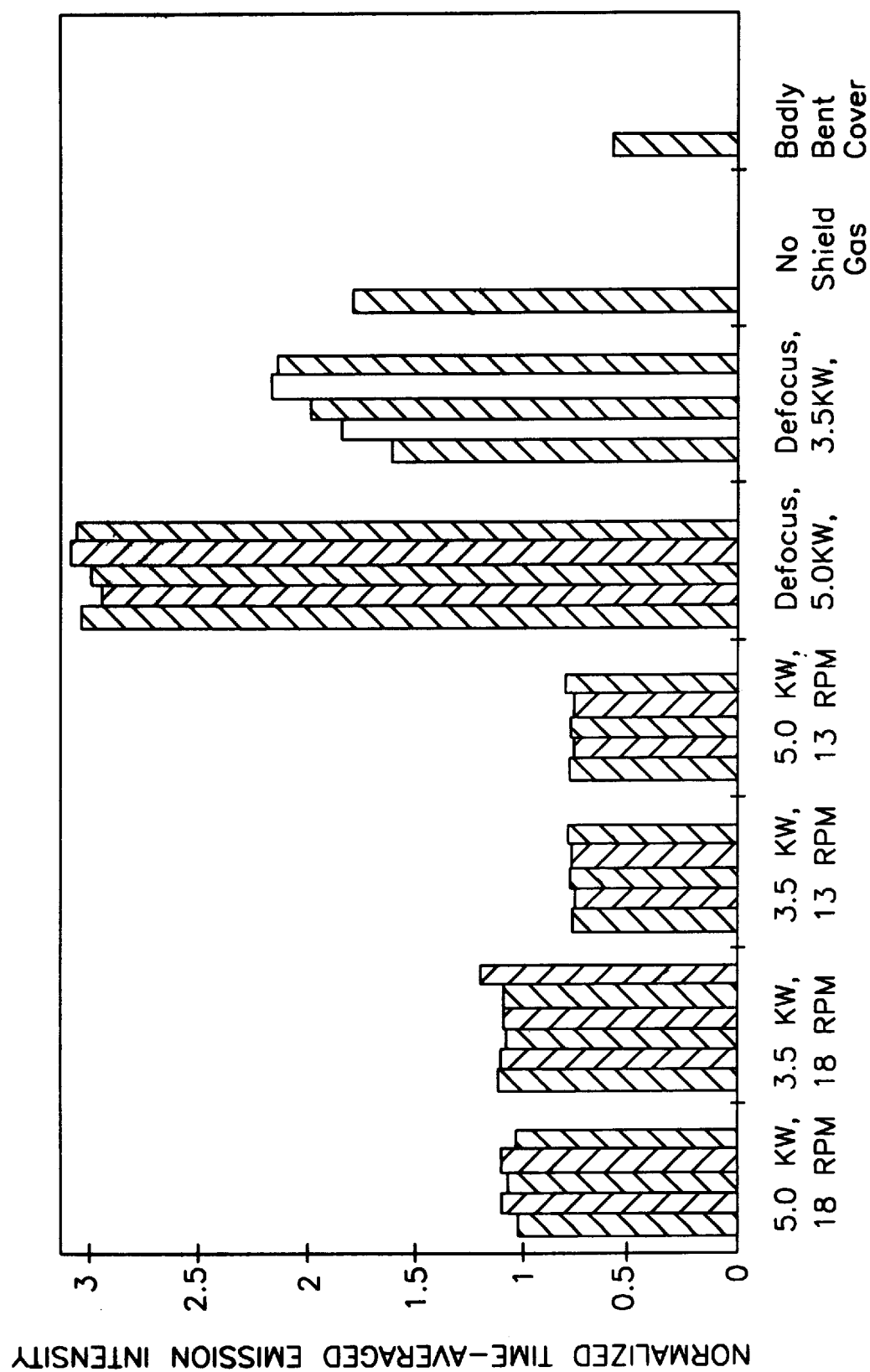

FIG. 5 is a comparison of mean time-averaged emission spectra between nominal laser power (5.0 kW; Tests 354–357) and low laser power (3.5 kW; Tests 360–364) at 18 RPM workpiece rotational speed;

FIG. 6 is a response of the broad-band blue-violet radiometer to a decrease in laser power from 5.0 kW (Test 357) to 3.5 kW (Test 364) at 18 RPM;

FIG. 7 is a temporal trace of plasma emission determined by the broad-band blue-violet filter radiometer at 5.0 kW and 13 RPM (Test 373);

FIG. 8 is a temporal trace determined by the broad-band blue-violet radiometer at 5.0 kW and 18 RPM, showing a dip at about 3 seconds (Test 355);

FIG. 9 is a temporal trace determined by the narrow-band radiometer at 3.5 kW, 13 RPM, showing a dip at about 1 second (Test 324);

FIG. 10 is a temporal trace determined by the broad-band blue-violet radiometer at 5.3 kW, 18 RPM, with the laser defocused (Test 337);

FIG. 11 is a response of the broad-band UV radiometer (UG-11) and the broad-band blue-violet radiometer (BG-12) to motor oil contamination of the workpiece at 5.3 kW, 18 RPM (Test 347);

FIG. 12 illustrates the emission intensity at 427.5 nm determined by the OMA (Test 347);

FIG. 13 is a response of the broad-band UV and blue-violet radiometers to grease contamination of the workpiece at 5.3 KW, 18 RPM, showing dips at about 0.7 seconds and 1.5 seconds (Test 348);

FIG. 14 illustrates the emission intensity at 427.5 nm (OMA) (Test 348);

FIG. 15 shows the temporal trace at 5.3 kW, 18 RPM with no shield gas flow, as monitored by the broad-band blue-violet radiometer (Test 333);

FIG. 16 shows the response of the broad-band UV and blue-violet radiometers to a badly bent workpiece cover at 5.3 KW, 18 RPM (Test 352);

FIG. 17 shows the emission intensity at 427.5 nm monitored by the multichannel spectral analyzer (Test 352);

FIG. 18 shows the response of the broad-band blue-violet radiometer to changes in laser power and workpiece rotational speed in the weld overlap region, Region C;

FIG. 19 shows the response of the broad-band blue-violet radiometer to changes in laser power and workpiece rotational speed in the start-up region, Region A: 0–0.3 seconds;

FIG. 20 are temporal traces in Region A (start-up region) for five tests at nominal welding conditions as monitored by the broad-band blue-violet radiometer;

FIG. 21 are temporal traces in Region A (start-up region) for five tests at 3.5 kW, 18 RPM as monitored by the broad-band blue-violet radiometer;

FIG. 22 are temporal traces in Region C (weld overlap region) for five tests at 5.0 kW, 18 RPM as monitored by the broad-band blue-violet radiometer;

FIG. 23 are temporal traces in Region C (weld overlap region) for five tests at 3.5 kW, 18 RPM as monitored by the broad-band blue-violet radiometer;

FIG. 24 shows the response of the broad-band blue-violet radiometer to changes in laser power and workpiece rotational speed in Region B (steady state region);

FIG. 25 shows the response of the broad-band blue-violet radiometer to laser defocusing, no shield gas flow and a badly bent workpiece cover in Region B (steady state region);

FIG. 26 is the response of the narrow-band radiometer to changes in laser power and workpiece rotational speed in Region B (steady state region); and FIG. 27 is the response of the broad-band UV radiometer to various welding conditions in Region B (steady state region).

DESCRIPTION

To demonstrate the feasilibity of the present invention, weld monitoring tests were conducted using welding conditions similar to those typically used in the actual production of the workpiece. The primary test matrix included multiple tests at different laser power and workpiece rotational speed conditions. Tests were also conducted with the laser beam defocused; with no shield gas flow about the plasma; with contaminants placed between the welded surfaces; and with mechanically deformed workpieces, to observe changes in the intensity of the light emitted from the plasma as a result of the changed conditions.

Welding Assembly

Figure 1:
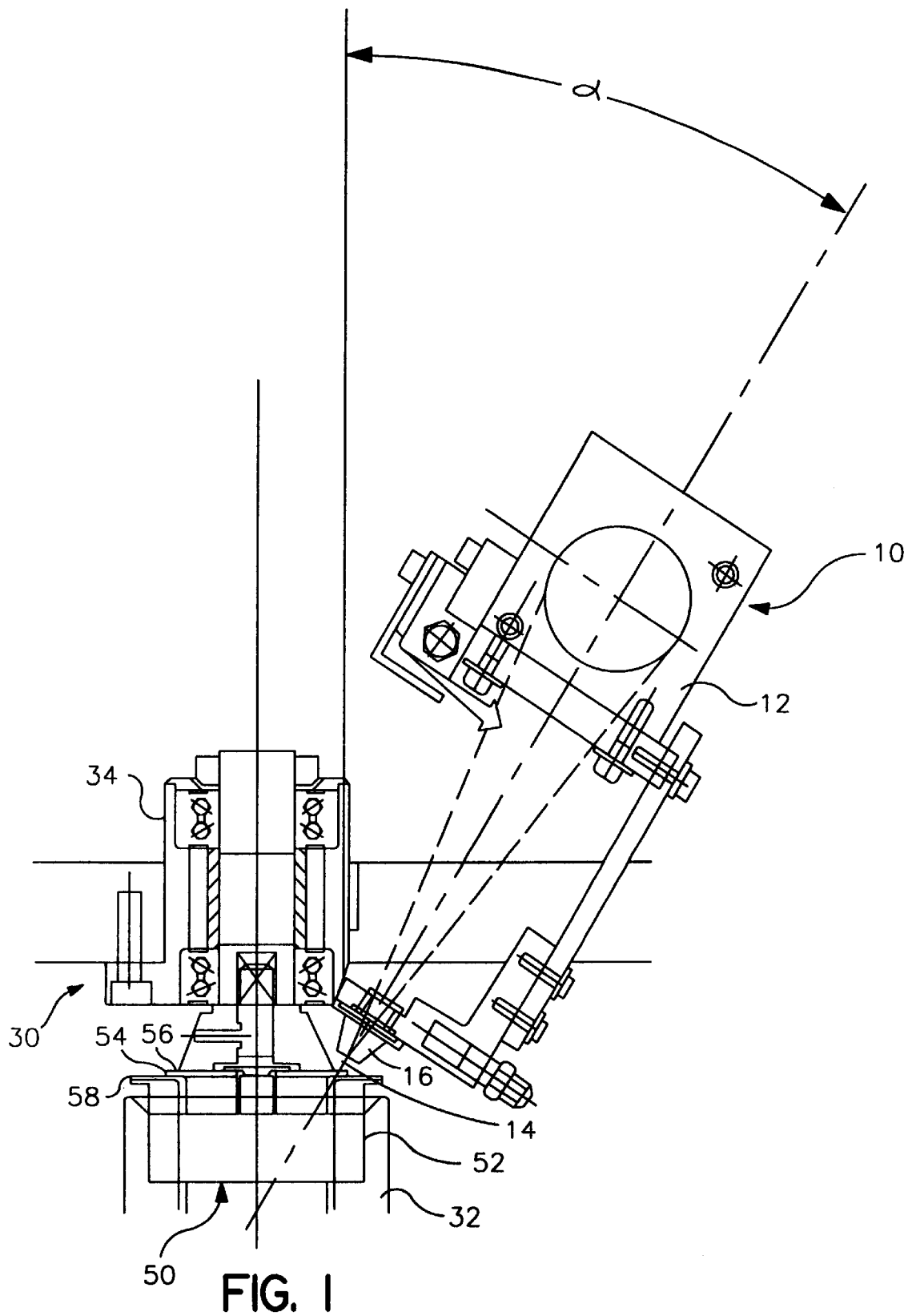
FIG. 1 is a schematic diagram of a welding assembly used in conducting in-process weld monitoring tests according to the present invention.

FIG. 1 illustrates a laser welding assembly as used in the tests, including a laser beam delivery system 10 and a welding fixture 30 for fixturing a workpiece 50. The laser beam delivery system 10 comprises a laser 12 for generating a laser beam 14 and focusing optics 16 for focusing the laser beam. The laser is a continuous output, carbon dioxide ($CO_2$) laser. The focusing optics 16 include a 20-cm focal length lens. The welding fixture 30 comprises a base 32 and a clamping portion 34 which is movable relative to the base. The workpiece 50 was a vehicle airbag inflator, including a base 52 and a cover 54 which was welded to the base 52. During the welding process, the base 52 of the workpiece was received in the base 32 of the welding fixture 30 and the cover was fixed on the base 52 by the clamping portion 34. The laser beam 14 impinged on the top surface 56 of the cover 54 as the workpiece 50 was rotated relative to the laser beam 14, forming a circular penetration weld between the cover 54 and the underlying rim 58 of the base 52.

The workpiece 50 was rotated at a speed of about 13 RPM in some of the tests and at about 18 RPM in the other tests. The laser 12 was focused onto the workpiece 50 at an angle of about 25° relative to the normal to the top surface 56 of the cover 54. The laser beam 14 spot size on the top surface 56 was about 0.5 mm under nominal operating conditions as described below. A colinear flow of helium shield gas was used to suppress the weld plasma. The workpieces were formed of 301 stainless steel, comprising by weight: Fe (69–74%), Cr (16–18%), Ni (6–8%), Mn (2%), Si (1%) and C (0.1% max).

Weld Plasma Monitoring

Optical Multichannel Analyzer

Figure 2A:
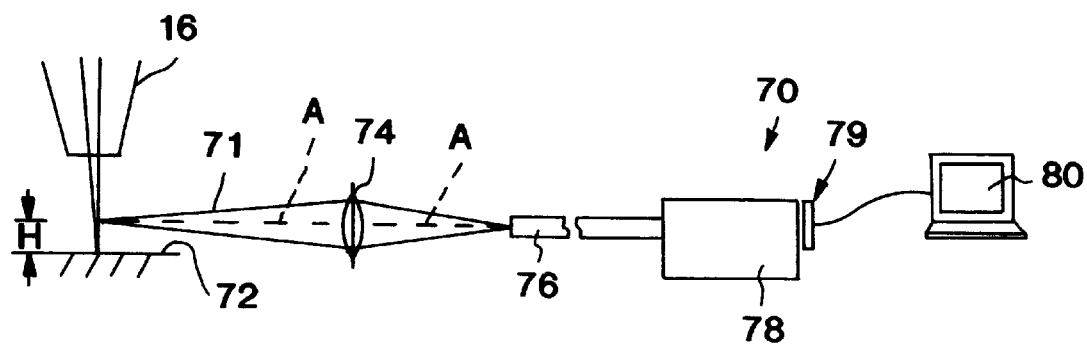
FIG. 2A illustrates an optical multichannel analyzer (OMA) setup used in the monitoring tests.

Spectral analysis was performed using an optical multichannel spectral analyzer (OMA), to determine the most suitable range of wavelengths of the light emitted from the plasma for monitoring the laser welding process. The experimental setup 70 is shown in FIG. 2A. The light 71 emitted from the plasma at a height H of about 0.3 mm above the weld surface 72 (the top surface 56 of the cover 54) was collected in a horizontal direction at an angle of about 0° between the optical axis A of a focusing lens 74 and the weld surface 72 by the focusing lens 74 having a 20-cm focal length, and imaged onto an end of an optical cable 76 optically coupled to the lens 74 which received and transmitted the collected light. The light was transmitted to a spectrometer 78 optically coupled to the optical cable 76 for spectrally dispersing the collected light. The spectrally dispersed light as converted into electric signals by a linear array detector 79 operatively associated with the spectrometer 78, and then recorded by an OMA console 80 (EG&G Model No. OMA III). The emission spectra from the plasma were recorded about every 20 ms from the start to the completion of the welding process. For each test performed at a workpiece rotational speed of 18 RPM and 13 RPM, there were respectively 200 data points taken over a period of about 4 seconds, and 250 data points taken over a period of about 5 seconds, for each emission spectrum. The OMA 80 covered emission spectra over the wavelength range of from about 250 nm to about 560 nm.

Other data acquisition systems such as oscilloscopes can optionally be used instead of the OMA.

Broad-Band UV Radiometer

Figure 2B:
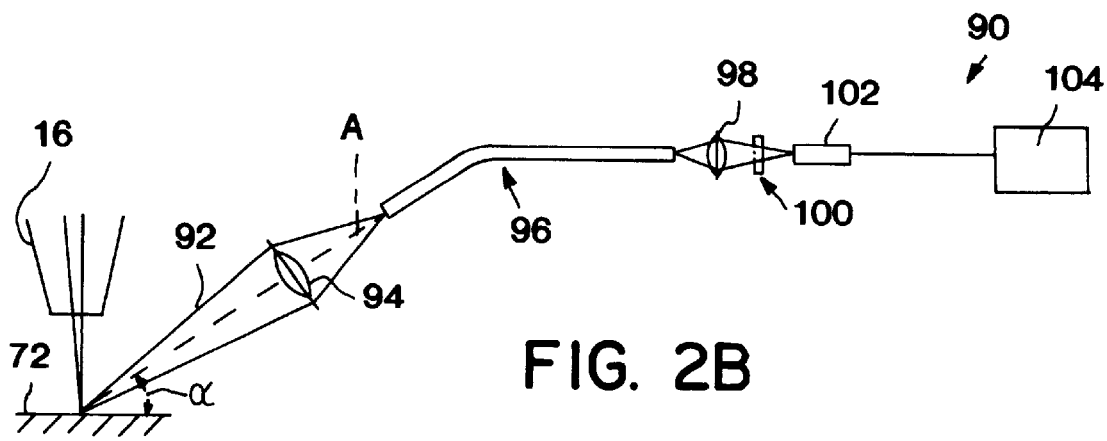
FIG. 2B illustrates a broad-band ultraviolet (UV) radiometer setup used in the monitoring tests.
Figure 3:
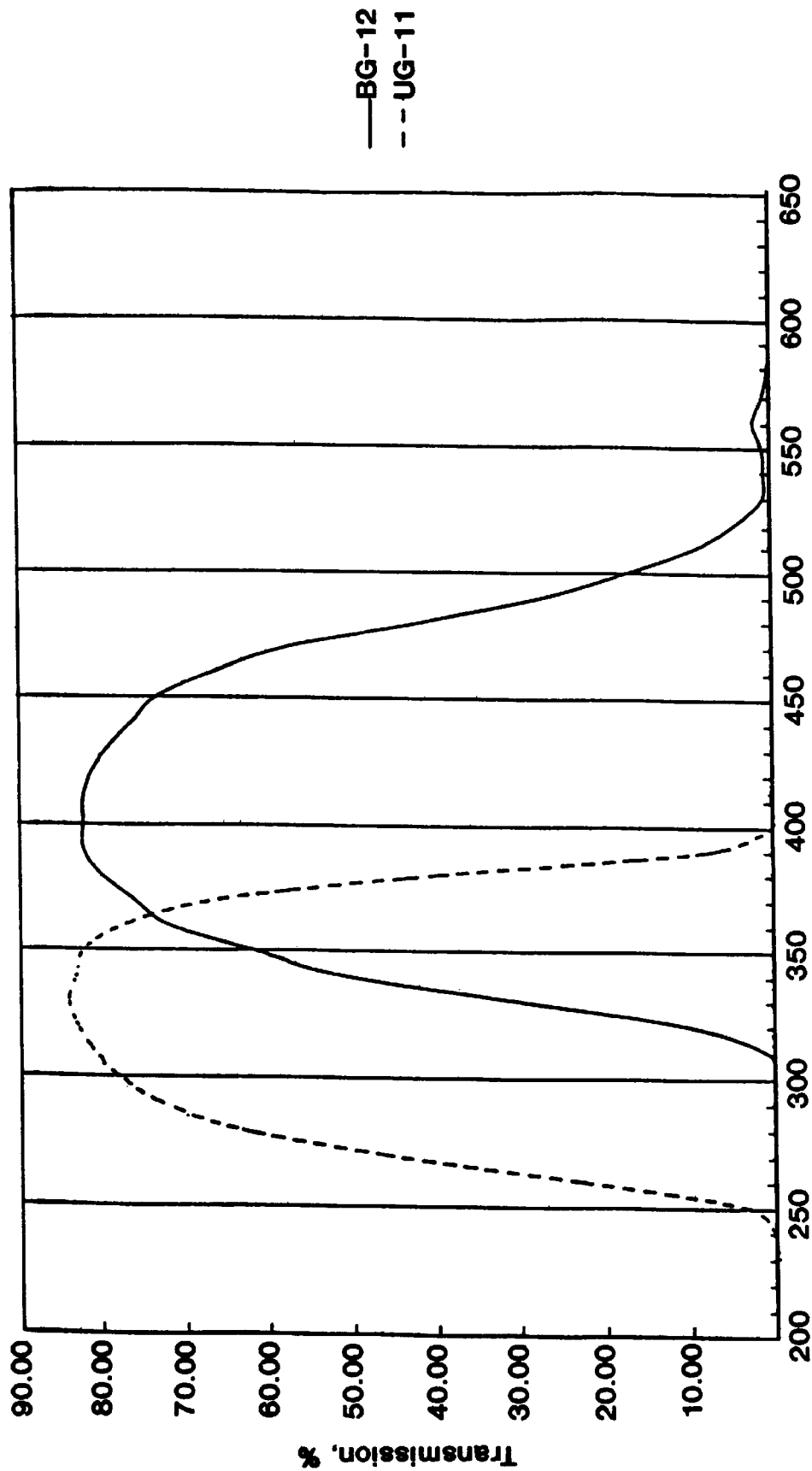
FIG. 3 illustrates the light transmission curves of the filters used: Schott UG-11 type colored glass in the broad-band UV and Schott BG-12 type colored glass in the blue-violet radiometer setups of FIGS. 2B and 2C, respectively.

A setup 90 used for monitoring with a broad-band ultraviolet (UV) radiometer is shown in FIG. 2B. Light emitted from the weld surface 72 was viewed through the weld plasma, at an angle α of about 30° defined between the optical axis A of a lens 94 and the weld surface 72. The light emission 92 was collected by the lens 94 having a 20-cm focal length and directed onto an end of a fiber optic cable 96. The light 92 was passed through a focusing lens 98 and a light filter 100 (Schott UG-11 type colored glass filter), having a light transmission band in the range of from about 240 nm to about 380 nm, to a UV-enhanced silicon detector 102 optically coupled to the light filter 100. The detector 102 converted the light signals to electrical signals. The percent transmission versus wavelength curve for the UG-11 filter 100 is shown in FIG. 3. The output from the detector 102 was recorded by a digital scope 104 (Tektronic Model No. 540A).

Broad-Band Blue-Violet Radiometer

Figure 2C:
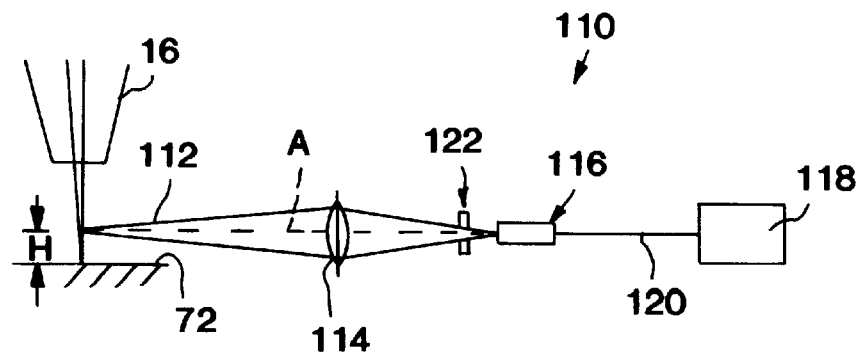
FIG. 2C illustrates a broad-band blue-violet radiometer setup used in the monitoring tests.

A setup 110 used for monitoring with a broad-band blue-violet radiometer is shown in FIG. 2C. The light 112 emitted from the plasma emission at a height H of approximately 0.3 mm above the weld surface 72 was collected by a 20-cm focal length lens 114 and detected by a UV-enhanced silicon detector 116. The height H can be less than about 0.5 mm. The output from the detector 116 was recorded by a digital scope 118 electrically connected to the detector 116 via a conductor 120. A broad-band blue-violet filter 122 (Schott BG-12 type colored glass filter) was placed in front of the detector 116. The optical axis A of the lens 114 and the detector 116 was approximately parallel to the weld surface 72. The filter 122 has a light transmission band of from about 335 nm to about 530 nm, as shown in FIG. 3. The transmission curve for the broad-band blue-violet filter 122 is shifted to a longer wavelength range as compared to the broad-band UV filter 100.

Narrow-Band Radiometer

A setup used for monitoring the plasma light emission with a narrow-band radiometer is the same as shown in FIG. 2C for the broad-band blue-violet radiometer 110, except that the BG-12 filter 122 was replaced with a narrow-band interference filter (Corion Model P8-450), having a band center at about 453 nm and a band width of about 8 nm. The narrow-band filter was used primarily to transmit the light emission from the Fe(I) transition at 452.9 nm. The light emission from the weld plasma was viewed horizontally at an angle of about 0° defined between the optical axis of the lens 114 and the weld surface 72. The light emission at a height H of about 0.3 mm above the weld surface 72 was collected by the lens 114 and detected by the UV-enhanced silicon detector 116. The electrical output from the narrow-band radiometer was recorded by the digital scope 118 (Tektronic Model No. 540A).

Test Conditions

TABLE 1 below lists the test conditions used in the tests.

TABLE 1

| | TEST CONDITIONS | | |
|---|---|---|---|
| TEST NO. | LASER POWER (kW) | WORKPIECE ROTATIONAL SPEED (RPM) | COMMENTS |
| 314–17 | 5.3 | 18 | Nominal laser power/nominal rotational speed. |
| 318, 319 | 3.5 | 18 | Low laser power/nominal rotational speed. |
| 320–324 | 3.5 | 13 | Low laser power/low rotational speed. |
| 325–330, 370–374 | 5.3 | 13 | Nominal laser power/low rotational speed. |
| 332 | 5.3 | 18 | Nominal laser power/nominal rotational speed. |
| 333 | 5.3 | 18 | No shield gas. Dirty weld. |
| 334 | 5.3 | 18 | With shield gas. No data |

TABLE 1-continued

TEST CONDITIONS

| TEST NO. | LASER POWER (kW) | WORKPIECE ROTATIONAL SPEED (RPM) | COMMENTS |
|---|---|---|---|
| 335 | 5.3 | 18 | collected With shield gas. |
| 336–345 | 5.3 | 18 | +2 mm (up) laser beam defocus. |
| 346 | 5.3 | 18 | Hydraulic fluid at 4 locations between weld surfaces.. |
| 347 | 5.3 | 18 | Motor oil at 4 locations between weld surfaces. |
| 348 | 5.3 | 18 | Bar grease at 4 locations between weld surfaces. |
| 352 | 5.3 | 18 | Badly bent cover. |
| 353 | 5.3 | 18 | Slightly bent cover. |
| 354–359 | 5.0 | 18 | Nominal laser power/nominal rotational speed. |
| 360–364 | 3.5 | 18 | Low laser power/nominal rotational speed. |
| 365–369 | 3.5 | 13 | Low laser power/low rotational speed. |

The primary test matrix included multiple tests at 5.0–5.3 kW laser power (referred to herein as "nominal laser power") and a workpiece rotational speed of about 13 RPM (Tests 325–330, 370–374); nominal laser power and a workpiece rotational speed of about 18 RPM (referred to herein as "nominal workpiece rotational speed") (Tests 314–317, 332, 335, 354–357 and 359); at low laser power of about 3.5 kW and low workpiece rotational speed (Tests 320–324, 365–369); and at low laser power and nominal workpiece rotational speed (Tests 318, 319, 360–364). Tests were also conducted with the laser beam defocused (Tests 336–345); with no shield gas flow (Test 333); with various fluid contaminants (hydraulic fluid, motor oil and grease) introduced between the weld surfaces to induce bad welds (Tests 346–348); and with physically deformed workpieces (Tests 352 and 353).

In the analysis of the test data, both the time-averaged emission intensity and the temporal traces for the emission intensity were evaluated. In the calculation of the time-averaged emission intensity, only data collected during the relatively stable plasma region (Region B) of the weld process (excluding the start-up region, Region A; and the weld overlap region, Region C) were used. The weld overlap region is that portion of the welding process during which the laser beam impinges on as-welded material after the complete weld is formed. Specifically, for tests at a workpiece rotational speed of 18 RPM, the average emission intensity was the time-averaged value of the intensity measured between about 0.5 seconds and about 2.7 seconds. This time period was estimated to exclude Regions A and C. For tests conducted at a workpiece rotational speed of 13 RPM, the average emission intensity was the time-averaged value of the intensity measured between about 0.5 seconds and about 3.8 seconds. This time period was estimated to exclude Regions A and C.

As described below, the light emission intensities monitored in Regions A and C can also be used to calculate the time-averaged intensity to distinguish between good welds and bad welds.

Test Results
Laser Power and Workpiece Rotational Speed
Weld Visual Inspection

Welded pieces produced in Tests 316, 320, 325, 355, 357, 362, 370 and 372 were sectioned and visually inspected to determine the depth of the weld penetration and locate any weld defects. Referring to FIG. 1, a weld penetration extending through both the workpiece cover 54 and the rim 58 of the base 52 was considered satisfactory. The visual inspection results are summarized in TABLE 2 below.

TABLE 2

VISUAL INSPECTION RESULTS

| TEST NO. | PROCESS PARAMETERS | COMMENTS |
|---|---|---|
| 316, 355, 357 | 5.3 kW/18 RPM | Nominal laser power/nominal speed. Good weld. |
| 362 | 3.5 kW/18 RPM | Low laser power/nominal speed. Bad weld. |
| 320, 367 | 3.5 kW/13 RPM | Low laser power/low speed. Good weld. |
| 325, 370, 372 | 5.3 kW/13 RPM | Nominal laser power/low speed. Good weld. |
| 333 | 5.3 kW/18 RPM. No shield gas flow. | Insufficient penetration. |
| 336 | 5.3 kW/18 RPM. +2 mm (up) defocus. | Bad weld with insufficient penetration. |
| 342 | 3.5 kW/18 RPM. +2 mm (up) defocus. | Bad weld, approximately 60% of area unwelded. |
| 343 | 3.5 kW/18 RPM. +2 mm (up) defocus. | Bad weld having essentially no strength. |
| 344 | 3.5 kW/18 RPM. +2 mm (up) defocus. | Bad weld, approximately 60% of area unwelded. |
| 345 | 3.5 kW/18 RPM. +2 mm (up) defocus. | Bad weld, approximately 75% of area unwelded. |
| 347 | 5.3 kW/18 RPM. Motor oil contamination at four locations. | Sectioning was not performed at contaminated locations. |
| 348 | 5.3 kW/18 RPM. Bar grease contamination at four locations. | Insufficient weld penetration at one of eight inspected locations. Weld surface depression at two of eight inspected locations. |
| 352 | 5.3 kW/18 RPM. Badly bent cover. | Bad weld having insufficient depth of penetration. Wide vertical crack and weld surface depression. |
| 353 | 5.3 kW/18 RPM. Slightly bent cover. | Good weld. |

The test results show that at a nominal laser power (5.0–5.3 kW), welds of acceptable quality (good welds) were consistently produced at both 13 RPM and 18 RPM. At 3.5 kW laser power, however, good welds were produced at 13 RPM rotational speed, but welds of unacceptable quality (bad welds) having insufficient penetration depth were produced at 18 RPM.

Optical Multichannel Spectral Analyzer

Figure 4:
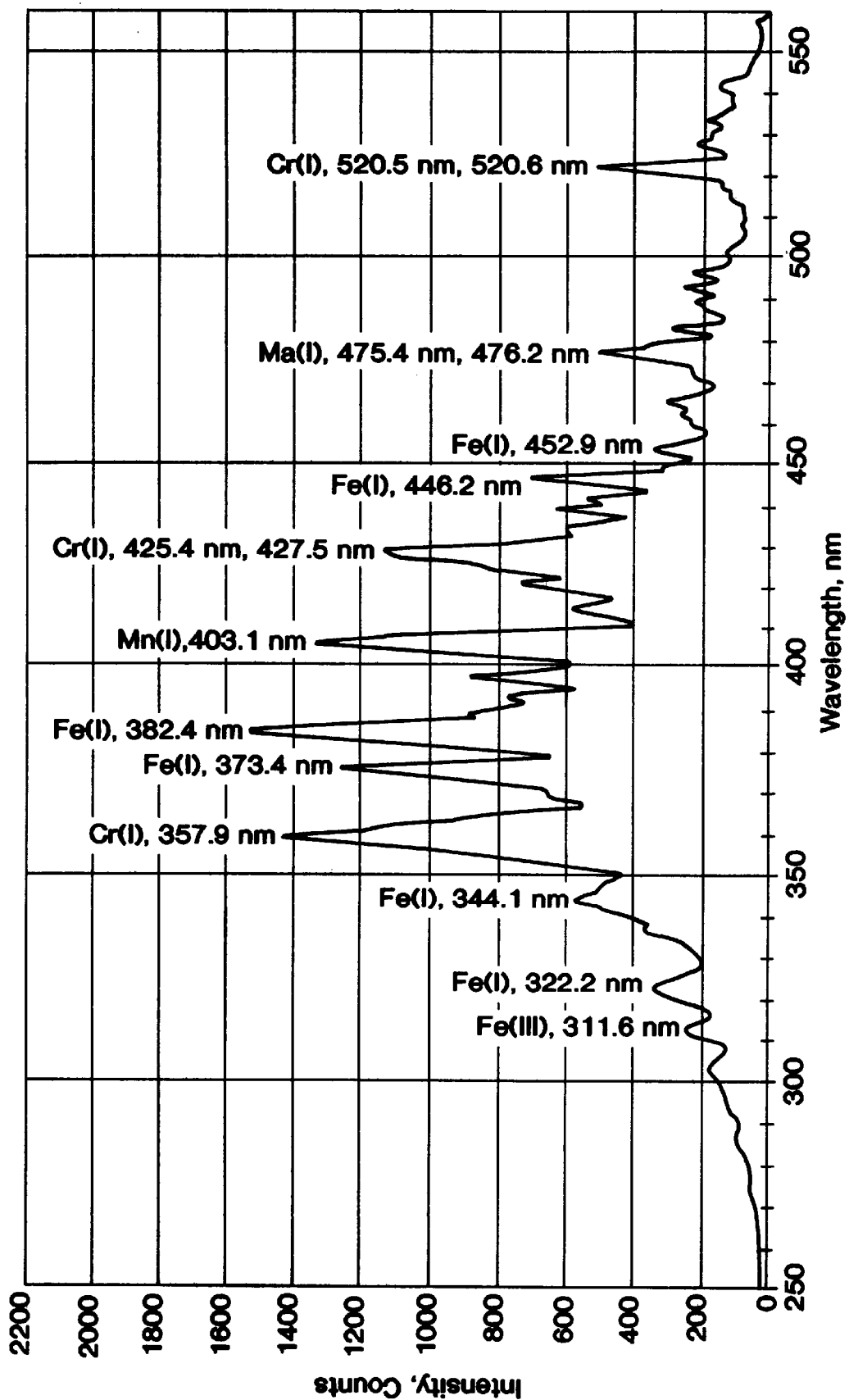
FIG. 4 is a typical plasma emission spectrum under nominal laser welding conditions (5.0 kW/18 RPM)

Referring to FIG. 4, the most prominent peaks in the emission spectra from the plasma were all within the range of from about 340 nm to about 450 nm. The major peaks in this range correlate to atomic transitions of Fe (373.4 nm and 382.4 nm), Cr (357.9 nm and 425.4 nm/427.5 nm) and Mn (403.1 nm), comprising the 301 stainless steel workpieces.

Two emission spectra are displayed in FIG. 5. One spectrum is the mean for Tests 354–357 and Test 359 at 5.0 kW and 18 RPM, and the other spectrum is the mean for Tests 360–364 at 3.5 kW and 18 RPM. The intensity of the emission spectrum at the lower power is about 10% higher than that at the higher power, across the range of wavelengths. No specific wavelength yielded a higher percentage of intensity change due to either a decrease or an increase in the laser power. This same result was observed in the intensity of the emission spectra obtained under other operating conditions described herein, including with the laser defocused, with no shield gas flow, with bent workpieces, and with contamination at the weld.

Based on the OMA results, the wavelength range of from about 340 nm to about 450 nm was selected for radiometer measurements based on having the most prominent peaks and the highest signal-to-noise ratios.

The most suitable wavelength range for monitoring the welding process depends on the composition of the material that is welded. Different wavelength ranges can have the most prominent peaks during laser welding of other metals such as other ferrous materials, and non-ferrous materials such as copper, aluminum and titanium materials. The OMA can be used to determine the most appropriate wavelength range for such other materials.

Broad-Band Blue-Violet Radiometer

Based on the strong OMA signals in the wavelength range of from about 340 nm to 450 nm, the broad-band blue-violet filter was used to filter the light emitted from the plasma in some tests.

Tests 335, 354–357 and 359 were conducted at nominal laser power and rotational speed. Good welds were produced. The mean of the time-averaged emission intensity was 6.35 mV (standard deviation, $\sigma=0.26$ mV).

Tests 360–364 were conducted at 3.5 kW laser power and nominal rotational speed. Bad welds with insufficient penetration depth were produced. The mean of the time averaged emission intensity was 7.62 mV ($\sigma=0.16$ mV).

Tests 365–369 were conducted at 3.5 kW laser power and 13 RPH rotational speed. Good welds were produced, and the mean time-averaged emission intensity was 6.19 mV ($\sigma=0.06$ mV).

Tests 370–374 were conducted at nominal laser power and 13 RPM rotational speed. Good welds were produced, and the mean time-averaged emission intensity was 6.72 mV ($\sigma=0.15$ mV).

Based on the test results, weld problems caused by overly low laser specific energy can be effectively diagnosed by monitoring emissions from the weld plasma with a broad-band blue-violet radiometer, preferably positioned substantially parallel to the weld surface and close to the weld plasma. There is an apparent emission intensity region of from about 5.57 mV to about 7.13 mV (corresponding to about $\pm 3\sigma$ of the mean value obtained under nominal laser power and workpiece rotational speed, and with shield gas flow, sufficient cleanliness at the weld zone, lack of physical deformation of the workpiece, and proper focusing of the laser beam onto the workpiece), that correlates with good welds.

Instead of using the absolute emission intensity value as a measure of weld quality, the data can alternately be analyzed using normalized values. In TABLE 3 below, the data are normalized with respect to the mean of the values from tests conducted under nominal laser power and workpiece rotational speed conditions. The mean value of the emission intensity at nominal laser power and workpiece rotational speed is referred to herein as the "nominal mean value."

TABLE 3

RESPONSE TO LASER POWER AND
WORKPIECE ROTATIONAL SPEED VARIATIONS

| TEST NO. | LASER POWER (kW) | WORKPIECE SPEED (RPM) | NORMALIZED EMISSION INTENSITY | |
|---|---|---|---|---|
| | | | Broad-Band UV | Broad-Band Blue-Violet |
| 314–317, 332, 335, 354–359 | 5.3 | 18 | | |
| | | Nominal Mean | 1.00 | 1.00 |
| | | Std. Dev.($\sigma$) | 0.08 | 0.04 |
| 318, 319, 360–364 | 3.5 | 18 | | |
| | | Mean | 1.12 | 1.20 |
| | | Std. Dev.($\sigma$) | 0.05 | 0.02 |
| 320–324, 365–369 | 3.5 | 13 | | |
| | | Mean | 0.78 | 0.98 |
| | | Std. Dev.($\sigma$) | 0.03 | 0.01 |
| 325–330 | 5.3 | 13 | | |
| 370–374 | 5.0 | 13 | | |
| | | Mean | 0.78 | 1.06 |
| | | Std. Dev.($\sigma$) | 0.04 | 0.02 |

The mean value of the time-averaged emission intensity at low laser power and nominal rotational speed (Tests 318, 319 and 360–364) was about 20% higher than the nominal mean value. These welds had insufficient depth of penetration. Also, the mean values of the time-averaged emission intensity for the other two weld conditions that produced good welds were respectively only slightly below (Tests 320–324 and 365–369) and slightly above (Tests 370–374) the nominal mean value. The broad-band blue-violet radiometer, therefore, is very responsive to weld penetration problems caused by low laser specific energy.

FIG. 6 shows a typical temporal trace of the emission intensity of the weld plasma for nominal laser power and workpiece rotational speed conditions (Test 357). The emission intensity was relatively stable with respect to time, except at the start of the weld and in the weld overlap region. A steep dip D in the emission intensity in the weld overlap region at about 3.3 seconds was believed to have been caused by a sudden change in material properties of the workpiece, as the laser beam impinged on welded material having different physical and chemical properties than the material had before being heated by the laser beam. The temporal traces (such as of Test 364 shown in FIG. 6) for the emission intensity at 3.5 kW laser power and 18 RPM workpiece rotational speed were similar in shape to those at 5.0 kW and 18 RPM, but had greater time-averaged intensity values.

Referring to FIG. 7, there were less fluctuations in the temporal traces at 13 RPM than at 18 RPM. It is believed that the weld plasma became very stable at the lower rotational speed.

Referring to FIG. 8, in Test 355 a steep dip D occurred at about 3 seconds, just prior to the beginning of the weld overlap region. It is believed that this dip represented a localized weld problem, possibly due to a variation in the material properties (presence of contamination or a change in local composition of the workpiece), workpiece surface deformation, or an abrupt change in an operating condition such as the laser power. Therefore, the time-averaged emission intensity in the steady state portion of the temporal trace can be used to detect overall weld problems caused by prolonged (approximately several second duration) operating condition variations such as drops in laser power or changes in workpiece rotational speed. Sudden, sharp changes in the temporal trace can be used to identify a localized weld problem.

Narrow-Band Filter Radiometer

TABLE 4 below gives the test results for the tests monitored with the narrow-band (452.9 nm) filter radiometer.

TABLE 4

NARROW-BAND RADIOMETER RESPONSE TO CHANGED WELDING CONDITIONS

| TEST NO. | LASER POWER (kW) | WORKPIECE SPEED (RPM) | NORMALIZED EMISSION INTENSITY |
|---|---|---|---|
| 314–317 | 5.3 | 18 | |
| | | Nominal Mean | 1.00 |
| | | Std. Dev.($\sigma$) | 0.03 |
| 318, 319 | 3.5 | 18 | |
| | | Mean | 1.27 |
| | | Std. Dev.($\sigma$) | 0.03 |
| 320–324 | 3.5 | 13 | |
| | | Mean | 0.97 |
| | | Std. Dev.($\sigma$) | 0.06 |
| 325, 326 | 5.3 | 13 | |
| | | Mean | 0.97 |
| | | Std. Dev.($\sigma$) | 0.02 |

The mean value of the time-averaged emission intensity at low laser power (3.5 kW) and nominal rotational speed (Tests 318 and 319) for bad welds was about 27% higher than the nominal mean value for good welds (Tests 314–317). Furthermore, the mean values of the time-averaged emission intensity for the other two weld conditions that produced good welds (Tests 320–324 and Tests 325 and 326) were only slightly below the nominal mean value. Therefore, based on these results, monitoring with the narrow-band filter radiometer can be effective in distinguishing between good welds and bad welds caused by low laser specific energy.

Referring to FIG. 9, in the temporal trace of the emission intensity, a steep dip D occurred at about 1 second into the weld process in Test 324 (3.5 kW/13 RPM). It is believed that this dip represented a localized weld problem. Based on this result, the narrow-band filter radiometer can detect localized weld problems.

The narrow-band filter radiometer provided good responses to changed operating conditions. The signal strengths, however, were lower than those of the broad-band blue-violet radiometer, due to the lower emission intensity at 452.9 nm (FIGS. 4 and 5) and the narrow spectral coverage. Accordingly, the narrow-band filter radiometer is less preferred than the broad-band blue-violet radiometer for monitoring laser welding processes.

Broad-Band UV Radiometer

The test results indicated that monitoring the plasma emission intensity with the broad-band UV radiometer setup 90 was not as effective in distinguishing between good welds and bad welds as monitoring with the broad-band blue-violet radiometer setup 110. It was found that good welds produced at nominal laser power and rotational speed (Tests 355 and 357) gave the same strong signals as bad welds at low laser power and nominal rotational speed (e.g., Tests 363 and 364). Table 3 shows that the mean value of the time-averaged emission intensity at low laser power and nominal rotational speed (tests 318–319 and 360–364) for bad welds is not significantly different from the norminal mean value bounded by as an example, +3 to −3 standard deviations for good welds. In addition, the broad-band UV radiometer failed to detect dips caused by workpiece surface contamination, as described below.

It is believed that the test results can be attributed to monitoring the weld plasma and weld surface at a large angle of about 30° relative to the weld surface 72, as compared to viewing the plasma horizontally at a small angle, preferably of about 0° and close to the surface, as was done with the broad-band blue-violet radiometer setup 110. Accordingly, monitoring the plasma horizontally relative to the weld surface is preferred.

Laser Defocusing

TABLE 5 below gives the response of the broad-band blue-violet and broad-band UV radiometers to different welding conditions, including laser defocusing, absence of shield gas, workpiece surface contamination, workpiece physical deformation.

Tests 336–345 were conducted at nominal rotational speed and with the focused $CO_2$ laser spot moved up (+) 2 mm out of focus. The spot size of the laser beam 14 was changed to about 0.8 mm. The weld formed in test 336 had insufficient depth of penetration.

Sectioning and visual analysis of the workpieces from Tests 342–345 (low laser power) revealed bad welds having unwelded areas of >60%. In Test 344, the weld had essentially no strength and the workpiece cover was easily removed by hand.

TABLE 5

RESPONSE TO CHANGED WELDING CONDITIONS

| TEST NO. | LASER POWER (kW) | WORKPIECE SPEED (RPM) | OTHER CONDITIONS | NORMALIZED EMISSION INTENSITY | | OTHER COMMENTS |
|---|---|---|---|---|---|---|
| | | | | Broad-Band UV | Broad-Band Blue-Violet | |
| 336–340 | 5.3 | 18 | Laser Defocused | | | |
| | | | Mean | 3.00 | 1.59 | |
| | | | Std. Dev. ($\sigma$) | 0.05 | 0.03 | |
| 341–345 | 3.5 | 18 | Laser Defocused | | | |
| | | | Mean | 1.91 | 1.80 | |
| | | | Std. Dev. ($\sigma$) | 0.23 | 0.07 | |
| 333 | 5.3 | 18 | No shield gas | 1.75 | 1.24 | Dips |
| 346 | 5.3 | 18 | Hydraulic fluid contamination | 0.78 | 1.04 | Spikes in blue-violet spectrum |
| 347 | 5.3 | 18 | Motor oil contamination | 0.72 | 1.03 | Dip in blue-violet spectrum |

TABLE 5-continued

RESPONSE TO CHANGED WELDING CONDITIONS

| TEST NO. | LASER POWER (kW) | WORKPIECE SPEED (RPM) | OTHER CONDITIONS | NORMALIZED EMISSION INTENSITY | | OTHER COMMENTS |
|---|---|---|---|---|---|---|
| | | | | Broad-Band UV | Broad-Band Blue-Violet | |
| 348 | 5.3 | 18 | Bar grease contamination | — | 0.88 | Dips |
| 352 | 5.3 | 18 | Badly bent cover | 0.53 | 0.53 | Waves |
| 353 | 5.3 | 18 | Slightly bent cover | 0.93 | 1.07 | |

At nominal laser power (Test 336–340) and low laser power (Tests 341–345), the mean light emission intensities with the defocused laser, as monitored by the broad-band blue-violet radiometer, were respectively about 59% and about 80% higher than the nominal mean value of 1.00. FIG. 10 shows a typical temporal trace of broad-band blue-violet signals for Test 337, with the emission intensity normalized with respect to the nominal mean value.

As shown in TABLE 5, the mean emission intensities with the defocused laser, as monitored by the broad-band UV radiometer, were about 300% (nominal laser power) and 91% (low laser power) above the nominal mean value.

Thus, laser defocusing problems can be effectively diagnosed by monitoring with either a broad-band blue-violet radiometer or a broad-band UV radiometer.

Workpiece Surface Contamination

Dips were found to be present in the temporal traces based on the time duration for weld pieces contaminated with motor oil. At 18 RPM, a dip was considered a significant change in the light intensity over a time duration exceeding about 30 ms, at which the intensity is reduced below 15% of the value before the start of the dip. At 13 RPM, a time duration of at least about 40 ms was considered sufficient. Referring to FIG. 11 for Test 347, a dip D occurred at about 3.2 seconds in the broad-band blue-violet radiometer temporal trace. The relative light intensity decreased from about 0.9 to down to about 0.1. The duration, at which the intensity drops below 15% of 0.9, is 130 ms. This duration exceeds 30 ms. Thus, this change was considered a dip.

The time duration of the dip is considered an important indicator of the severity of the localized weld problem. The longer the duration of the dip, the greater is the weld length that is potentially adversely affected. A sudden decrease in the intensity, such as due to a momentary decrease in the laser beam power, that does not last for the minimum time duration to be considered a dip, does not necessarily result in a bad weld. As the time duration of a dip increases, generally the greater is the reduction in the burst pressure strength of the resulting weld. A low burst pressure is highly undesirable in workpieces that are expected to maintain a high internal pressure until a predetermined time of pressure release.

In Test 347, motor oil was placed at four locations between the cover 54 and the rim 58 of the base 52 workpiece 50. One dip D occurred at about 3.2 second in the temporal traces of the broad-band blue-violet filter emissions (FIG. 11), and in the OMA signals (e.g., at 427.5 nm as shown) (FIG. 12) at about the same time location. No comparable dip was observed in the temporal trace of the broad-band UV radiometer (FIG. 11).

Referring to FIGS. 13 and 14, in Test 348, bar grease was placed at four locations between the cover 54 and the rim 58 of the base 52 of the workpiece 50. Dips D at about 0.7 seconds and about 1.5 seconds were observed in the temporal traces of the broad-band blue-violet radiometer emissions (FIG. 13) and the OMA signals (e.g., at 427.5 nm) (FIG. 14). Therefore, the dips may suggest locations of bad welds due to local changes or discontinuities in the workpiece composition. Sectioning of the welded piece into four pieces revealed insufficient depth of penetration of the weld at one of the eight inspected locations, and a weld surface depression at two of the inspected eight locations.

No Shield Gas Flow

Test 333 was conducted with no shield gas flow above the plasma. The resulting uncontrolled plasma produced very strong signals. As shown in TABLE 5, the time-averaged broad-band blue-violet radiometer signal was about 24% above the nominal mean value, and the time-averaged value for the broad-band UV radiometer was 75% above the nominal mean value. The signals for the broad-band blue-violet radiometer fluctuated erratically with numerous steep dips, as shown in FIG. 15. The resulting weld was bad. Therefore, it appears that each of the diagnostic techniques used in the tests can detect insufficient shield gas flow.

Based on the test results, a high signal strength does not necessarily correlate with good welds. Strong signals can correlate with bad welds, as an uncontrolled plasma with no shield gas flow produced very strong signals, but a poor weld. Very weak signals, on the other hand, usually indicate poor welds. Good welds are associated with moderately strong signals.

Workpiece Deformation

Two tests were conducted with the workpiece cover deformed. In Test 352, the workpiece cover was severely bent. FIG. 16 shows broad dips D in the temporal traces of the broad-band blue-violet and broad-band UV radiometer emissions. The resulting weld quality was unacceptable. FIG. 17 shows similar broad dips D in the OMA signals.

As shown in TABLE 5, the time-averaged signal strength for Test 352 for the broad-band blue-violet radiometer was significantly below the nominal mean value. The time-averaged broad-band blue-violet radiometer emission intensity was about 53% of the nominal mean value. Sectioning of the welded workpiece into three pieces revealed insufficient depth of weld penetration, a wide vertical crack, weld surface depression, and a gap between the cover and the base of the workpiece.

Thus, each of the monitoring techniques evaluated can effectively detect a serious surface defect such as a badly bent cover.

For Test 353, the workpiece cover was only slightly bent. No dip appeared in any of the signals (not shown) and visual inspection indicated a good weld. In addition, the time-averaged emission intensities for the broad-band blue-violet and UV radiometers were within 2σ of their nominal mean values (TABLE 5). Sectioning of the welded workpiece also indicated no weld problems. A slight surface defect, based on this result, can still produce a good weld.

Analysis in Regions A and C

The data used in the calculation of the time-averaged emission intensity are preferably generated during only the relatively most stable portion of the weld process (excluding the beginning and overlap regions). For comparative purposes, the emission intensities measured by the broad-band blue-violet radiometer in the beginning region of the weld (region A) and in the weld overlap region (region C) were also evaluated. The time-averaged emission intensities in region A (0–0.3 seconds for both 18 RPM and 13 RPM) and region C (3.2–3.5 seconds for 18 RPM, 4.45–4.75 seconds for 13 RPM) for Tests 354–359 (5.0 kW/18 RPM), Tests 360–364 (3.5 kW/18 RPM), Tests 365–369 (3.5 kW/13 RPM) and Tests 370–374 (5.0 kW/13 RPM) are presented in TABLE 6 below, and in FIGS. 18 and 19.

kW/13 RPM (both good welds), were similar to the emission intensities observed under the nominal operating condition.

FIGS. 20 and 21 show the temporal traces of emission intensities at 5.0 kW/18 RPM and 3.5 kW/18 RPM, respectively, in region A. The peak emission intensities were approximately the same. The emission intensities at 3.5 kW/18 RPM decreased at a slower rate than those at 5.0 kW/18 RPM as time progressed during the welding process.

FIGS. 22 and 23 show the temporal traces of emission intensities at 5.0 kW/18 RPM and 3.5 kW/18 RPM, respectively, in region C. The dip in the emission intensity was deeper at 5.0 kW/18 RPM than at 3.5 kW/18 RPM, possibly because during the initial welding process, the higher laser power provided good weld penetration and caused more significant material changes than at the lower laser power.

Based on the test results, the emission intensities in regions A and C can also be used to distinguish between good welds and bad welds caused by changes in laser specific energy.

TABLE 6

RESPONSE OF BROAD-BAND BLUE-VIOLET RADIOMETER IN REGIONS A AND C

|  | Region A | Region A | Region A | Region A | Region C | Region C | Region C | Region C |
|---|---|---|---|---|---|---|---|---|
| WORKPIECE ROTATIONAL SPEED | 18 RPM | 18 RPM | 13 RPM | 13 RPM | 18 RPM | 18 RPM | 13 RPM | 13 RPM |
| LASER POWER | 5.0–5.3 KW | 3.5 KW | 3.5 KW | 5.0 KW | 5.0 KW | 3.5 KW | 3.5 KW | 5.0 KW |
| Mean | 1.00 | 1.13 | 0.95 | 0.97 | 1.00 | 1.24 | 1.09 | 1.12 |
| STD. DEV. (σ) | 0.05 | 0.03 | 0.02 | 0.03 | 0.05 | 0.04 | 0.03 | 0.04 |

The results show that in region A, the mean emission intensity at 3.5 kW/18 RPM was about 13% higher than the nominal mean emission intensity at 5.0 kW/18 RPM (equated to 1.00). In region C, the mean emission intensity at 3.5 kW/18 RPM was about 24% higher than the nominal mean emission intensity at 5.0 kW/18 RPM (equated to 1.00). The emission intensities at 5.0 kW/13 RPM and 3.5

Comparison of Monitoring Techniques

The responses of the monitoring techniques evaluated to variations in material and operating conditions are summarized in TABLE 7 below.

TABLE 7

SUMMARY OF RESPONSES TO CHANGED WELDING CONDITIONS

|  | Laser Power Drop | Laser Defocused | No Shield Gas Flow | Badly Deformed Workpiece | Contaminated Weld Surface | Low Power at Low Speed |
|---|---|---|---|---|---|---|
| Broad-Band Blue-Violet Radiometer | ↑ | ↑ | ↑ | ↓ | Dips | No change |
| Narrow-Band Radiometer | ↑ | ↑ | ↑ | ↓ | Dips | No change |
| Broad-Band UV Radiometer | — | ↑ | ↑ | ↓ | Dips | ↓ |

The upward and downward arrows in TABLE 7 represent respective significant increases and decreases in emission intensities, as compared to intensities produced under nominal laser power and workpiece rotational speed conditions.

Broad-Band Blue-Violet Radiometer

The broad-band blue-violet radiometer, which covered all of the major emission lines from the weld plasma, was responsive to the material and operating conditions evaluated that can cause potentially defective welds. Monitoring light emissions from the weld plasma with the broad-band blue-violet radiometer in the horizontal position substantially parallel to the weld surface was effective in detecting insufficient weld depth of penetration and other weld defects caused by a combination of low laser power and nominal workpiece rotational speed; laser defocusing; no shield gas flow; workpiece deformation; and variations in the material properties such as caused by contamination at the weld. The mean emission intensity at low laser power and nominal rotational speed was about 20% higher than the nominal mean value.

In addition, it is believed that the standard deviations of the measured mean values were sufficiently low, to define emission intensity regions that distinguish between good welds and poor welds. Particularly, an emission intensity region bounded by about −3 to about +3 standard deviations of the nominal mean value, obtained under process and workpiece conditions that correlate with acceptable quality welds, is believed to correlate with good welds. Other suitable standard deviation ranges of the predetermined value can be determined through correlation of experimental data and quality of sectioned welds. Emission intensity values outside of approximately this range can be valuated as bad welds. The range can be used as a "preselected range," and the nominal mean value can be used as a representative baseline or "predetermined value" of the light emission intensity for monitoring the weld quality in laser processing.

The response of the broad-band blue-violet radiometer to the various weld conditions are summarized in Tables 3, 5 and 7, and FIGS. 24 and 25. Localized weld problems can be detected by identifying sudden dips or spikes in the emission intensity-time traces, caused by weld contamination, the presence of foreign solid or liquid materials, and workpiece deformation.

Narrow-Band Radiometer

As shown in FIG. 26 and TABLES 5 and 7, the narrow-band filter is effective in detecting insufficient weld penetration caused by low laser power at nominal workpiece rotational speed and other changes in process and workpiece conditions.

The OMA data, however, show that there is no prominent peak in the weld plasma emission spectra at the band center of the narrow-band filter of about 453.0 nm. Accordingly, selecting a filter having a passband more closely matching a prominent peak in the emission spectra can enhance spectral coverage and increase monitoring sensitivity.

Broad-Band UV Radiometer

The response of the broad-band UV radiometer to the various weld conditions are summarized in FIG. 27 and TABLES 3, 5 and 7. As described above, this device can be used to effectively detect some problems, such as laser defocusing, no shield gas flow and contaminated weld surfaces. The reason this technique is not as effective overall as the broad-band blue violet radiometer, however, is believed to be due to the difference in the angle and location of monitoring the plasma light emission.

In addition, as shown in FIGS. 3 and 4, the transmission band of the BG-12 type filter more closely corresponds to the light emission spectrum of the workpiece than did the UG-11 type filter used in the broad-band UV radiometer.

Optical Multichannel Analyzer

The optical multichannel spectral analyzer (OMA) is very useful in defining the optimal spectral region for monitoring weld problems. As a monitoring technique, it is less effective than the broad-band blue-violet radiometer in distinguishing between good welds and bad welds.

Weld Plasma Size/Emission Intensity/Weld Quality

U.S. patent application Ser. No. 08/956,881 titled "METHOD AND APPARATUS FOR MONITORING LASER WELD QUALITY VIA PLASMA SIZE MEASUREMENTS," filed concurrently herewith, describes a correlation between weld plasma size and weld quality. A possible explanation for the correlation between plasma light emission intensity and plasma size is that both are influenced by the same mechanism. Plasma is sustained by the excitation caused by the high power $CO_2$ laser. At a low laser power, the jet flow of vapor and droplets of molten liquid induced by laser ablation is expected to be reduced. This in turn reduce the rate in cooling the plasma by the jet. The reduction in cooling plasma can result in increases in plasma grow and thus higher plasma intensity. Similarly, if the weld surface is contaminated, for example, by hydraulic fluid, oil or grease, the $CO_2$ laser can induce a strong vapor jet via laser ablation. The strong gas flow in the jet can cool the plasma and results in diminishing and even extinguishing the plasma, and form a steep dip in the temporal traces of plasma intensity and plasma size.

The present method and apparatus for monitoring the emission of the weld plasma from the horizontal position can be used to reduce the false rejection of good parts (type I error) and to assure that significant weld problems are detected at the welding assembly. Accordingly, the present invention provides potential cost savings in manufacturing operations.

The present invention can be used to monitor weld quality during welding processes using other types of gas lasers than $CO_2$ lasers, as well as solid state lasers. The lasers can be continuous or pulsed output lasers.

The present invention can be used to monitor other laser materials processing applications such as metal cutting, powder metal sintering and heat treating processes.

The present invention can also be used to monitor welding processes that form various weld shapes other than circular welds, such as linear welds. In addition, other weld joint configurations than penetration welds such as butt welds and fillet welds can be monitored.

Although the present invention has been described in considerable detail with reference to certain preferred versions thereof, other versions are possible. Therefore, the scope of the appended claims should not be limited to the description of the preferred versions contained herein.

What is claimed is:

1. A method of monitoring the quality of a laser process in which a laser beam impinges onto a workpiece and a plasma is produced surrounding the workpiece, the method comprising the steps of:

a) providing a predetermined value representative of the intensity of light emitted from the plasma above a surface of the workpiece, the predetermined value being a time-averaged value determined under laser process conditions that produce acceptable quality welds;

b) determining a spectral region of the emission spectrum of the light emitted from the plasma above the surface during the laser process, the spectral region substantially encompassing the major emission peaks in the emission spectrum;

c) positioning a light filter having a transmission band covering at least a portion of the spectral region to receive light emitted from the plasma above the surface and to transmit wavelengths within the transmission band;

d) monitoring the time-averaged intensity of the light transmitted through the light filter during the laser process; and e) comparing the intensity of light monitored in step (d) to the predetermined value of the intensity of light, wherein the process is valuated as acceptable for values of the intensity of the light monitored in step (d) falling within a preselected range of the predetermined value.

2. The method of claim 1, wherein the light filter has a transmission band substantially covering the spectral region.

3. The method of claim 1, wherein the step of monitoring comprises monitoring the intensity of the light transmitted through the light filter using an ultraviolet-enhanced silicon photodiode.

4. The method of claim 1, wherein the step of monitoring comprises monitoring the time-averaged intensity of the light transmitted through the light filter during substantially only a steady state portion of the laser process.

5. A The method of claim 1, further comprising the step of correlating the time-averaged value of the intensity of the light transmitted through the light filter with (i) the speed of movement of the workpiece relative to the laser beam, and (ii) the power of the laser beam.

6. The method of claim 1, further comprising the step of correlating the time-averaged value of the intensity of the light transmitted through the light filter with at least one of the (i) focusing of the laser beam onto the surface of the workpiece; (ii) contamination on the workpiece; (iii) flow of a shield gas about plasma; (iv) level of physical deformation of the workpiece.

7. The method of claim 1, wherein the workpiece is an air bag inflator canister.

8. The method of claim 1, wherein the preselected range is from about −3 to about +3 standard deviations of the predetermined value.

9. A method of monitoring the quality of a laser process in which a laser beam impinges onto a workpiece and plasma is produced surrounding the workpiece, the method comprising the steps of:

a) providing a predetermined value representative of the intensity of light emitted from the plasma above a surface of the workpiece, the predetermined value being determined under laser process conditions that produce acceptable quality welds;

b) determining a spectral region of the emission spectrum of the light emitted from the plasma above the surface during the laser process by:
   i) collecting the light emitted from the plasma during the laser process;
   ii) converting the collected light to electric signals; and
   iii) recording the electric signals using a data acquisition system; the spectral region substantially encompassing the major emission peaks in the emission spectrum; the spectral region substantially encompassing the major emission peaks in the emission spectrum;

c) positioning a light filter having a transmission band covering at least a portion of the spectral region to receive light emitted from the plasma above the surface and to transmit wavelengths within the transmission band comprising positioning a focusing lens so that the optical axis of the focusing lens is (i) oriented at an angle of less than about 10° relative to the surface of the workpiece, and (ii) disposed at a height less than about 0.5 mm above the surface;

d) monitoring the intensity of the light transmitted through the light filter during the laser process; and e) comparing the intensity of light monitored in step (d) to the predetermined value of the intensity of light, wherein the process is valuated as acceptable for values of the intensity of the light monitored in step (d) falling within a preselected range of the predetermined value.

10. A method of monitoring the quality of a laser welding process in which a laser beam impinges onto a surface of an air bag inflator canister and a plasma is produced surrounding the surface, the air bag inflator canister being comprised of stainless steel, the method comprising the steps of:

a) providing a predetermined value representative of the intensity of light emitted from the plasma above the surface of the airbag inflator canister, the predetermined value being determined under laser welding process conditions that produce acceptable quality welds;

b) determining a spectral region of the emission spectrum of the light emitted from the plasma above the surface during the laser welding process, the spectral region substantially encompassing the major emission peaks in the emission spectrum;

(c) ositioning a focusing lens such that the optical axis is (i) substantially parallel to the surface of the air bag inflator canister, and (ii) disposed at height less than about 1 mm above the surface;

d), providing a blue-violet light filter having an optical axis and a transmission band substantially covering the spectral region;

e) monitoring the intensity of the light transmitted through the light filter in step (d); and f) comparing the intensity of light monitored in step (e) to the predetermined value, wherein the weld formed during the laser welding process is valuated as acceptable for values of the intensity of the light monitored in step (e) falling within a predetermined range of standard deviations of the predetermined value.

11. The method of claim 10, wherein the predetermined value of the intensity of light is a time-averaged value, and the step of monitoring comprises monitoring the time-averaged intensity of the light transmitted through the light filter.

12. The method of claim 11, wherein the step of monitoring comprises monitoring the time-averaged intensity of the light during substantially only a steady state portion of the laser welding process.

13. The method of claim 10, further comprising the step of correlating the time-averaged value of the intensity of the light with (i) the speed of movement of the air bag inflator canister relative to the laser beam, and (ii) the power of the laser beam.

14. The method of claim 10, further comprising the step of correlating the time-averaged value of the intensity of the light transmitted through the light filter with at least one of the (i) focusing of the laser beam onto the surface of the air bag inflator canister; (ii) contamination on the air bag inflator canister; (iii) flow of a shield gas about the plasma; (iv) physical deformation of the air bag inflator canister.

15. A method of monitoring the quality of a laser welding process in which a laser beam impinges onto an air bag inflator canister and a plasma is produced surrounding the air bag inflator canister, the air bag inflator canister being comprised of stainless steel, the method comprising the steps of:
- a) determining a spectral region of the emission spectrum of the light emitted from the plasma above the surface of the air bag inflator canister during the laser welding process, the spectral region substantially encompassing the major emission peaks in the emission spectrum;
- c) positioning a focusing lens relative to the surface of the air bag inflator canister such that the optical axis is (i) substantially parallel to the surface of the air bag inflator canister, and (ii) disposed at height less than about 1 mm above the surface;
- c) providing a broad-band blue-violet light filter having an optical axis and a transmission band substantially covering the spectral region;
- d) monitoring the intensity of the light transmitted through the light filter in step (c); and
- e) evaluating the intensity of light monitored in step (d) for the occurrence of dips in the intensity of light, the dips being representative of localized weld problems.

* * * * *